(12) United States Patent
Mirisola et al.

(10) Patent No.: US 9,204,188 B1
(45) Date of Patent: *Dec. 1, 2015

(54) DETERMINING SET-TOP BOX TUNING EVENTS

(75) Inventors: Raimundo Mirisola, London (GB); Tim Volodine, London (GB); Simon Michael Rowe, Finchampstead (GB); Daniel J. Zigmond, Menlo Park, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/174,632

(22) Filed: Jun. 30, 2011

Related U.S. Application Data

(60) Provisional application No. 61/489,649, filed on May 24, 2011, provisional application No. 61/486,134, filed on May 13, 2011.

(51) Int. Cl.
*H04H 60/33* (2008.01)
*H04H 60/32* (2008.01)
*H04N 21/442* (2011.01)

(52) U.S. Cl.
CPC ................. *H04N 21/44222* (2013.01)

(58) Field of Classification Search
CPC ............ H04N 21/44222; H04N 21/6582; H04N 7/17318; H04N 21/4532; H04N 21/812
See application file for complete search history.

(56) References Cited

U.S. PATENT DOCUMENTS

| | | | |
|---|---|---|---|
| 5,532,732 A | 7/1996 | Yuen et al. | |
| 5,600,364 A | 2/1997 | Hendricks et al. | |
| 5,872,588 A | 2/1999 | Aras et al. | |
| 2004/0133906 A1* | 7/2004 | Przybylek | H04H 60/40 725/9 |
| 2009/0178071 A1* | 7/2009 | Whitehead | 725/15 |
| 2010/0083299 A1* | 4/2010 | Nelson et al. | 725/19 |
| 2010/0333125 A1* | 12/2010 | Eldering et al. | 725/14 |
| 2011/0072449 A1* | 3/2011 | Ivanyi | 725/12 |
| 2012/0260280 A1* | 10/2012 | Harsh et al. | 725/21 |
| 2013/0084056 A1 | 4/2013 | Harsh et al. | |

* cited by examiner

*Primary Examiner* — Rong Le
(74) *Attorney, Agent, or Firm* — Foley & Lardner LLP; John D. Lanza

(57) ABSTRACT

A method, performed at a computer system having one or more processors and memory storing one or more programs executed by the one or more processors, includes receiving respective first set-top box (STB) information from a first plurality of STBs. The first STB information received from a respective STB in the first plurality of STBs includes tuning information for the respective STB in the first plurality of STBs, and power status information for a respective display device coupled to the respective STB in the first plurality of STBs. The method also includes filtering the power status information, and determining a viewership metric for the first plurality of STBs based on the tuning information and the filtered power status information in the first STB information.

18 Claims, 16 Drawing Sheets

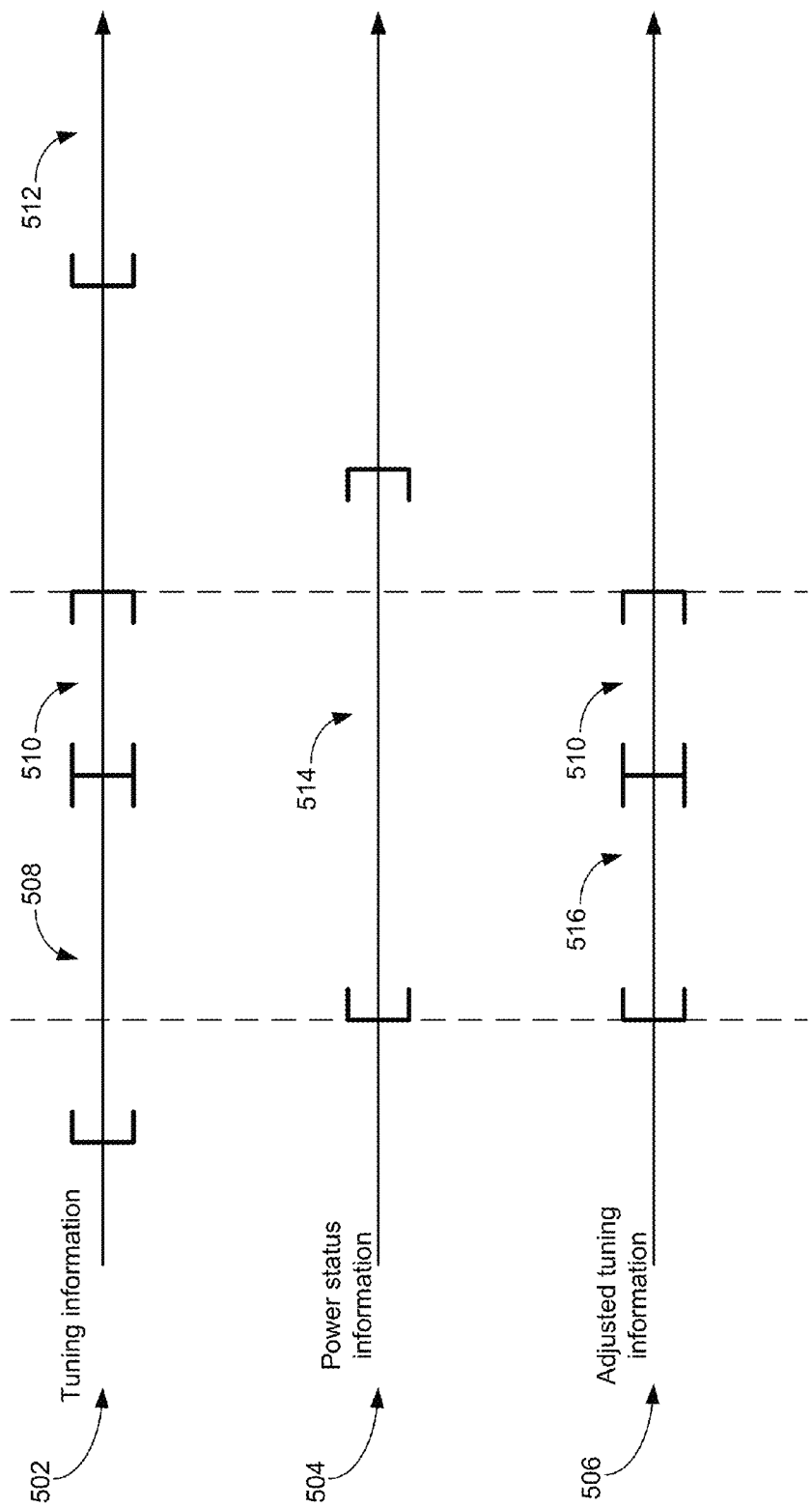

DETERMINING SET-TOP BOX TUNING EVENTS

RELATED APPLICATIONS

This application claims priority to U.S. Provisional Application Ser. No. 61/489,649, filed May 24, 2011, entitled "Determining Set-Top Box Tuning Events", and to U.S. Provisional Application Ser. No. 61/486,134, filed May 13, 2011, entitled "Determining Content Consumption Metrics Using Display Device Power Status Information", both of which are hereby incorporated by reference in their entireties.

BACKGROUND

The disclosed implementations relate to content consumption metrics.

Viewership metrics for television programming are important to producers of programming, distributors of programming, and advertisers alike. For example, producers of programming use viewership metrics to gauge the performance of their programming and to make decisions regarding the creative direction for their programming. Distributors of programming use viewership metrics to gauge the performance of programming they distribute and to make decisions regarding programming acquisitions for distribution. Advertisers use such metrics to value advertisement slots associated with programming. Thus, viewership metrics that are accurate are important to the stakeholders involved.

One method of determining viewership metrics is to determine the channels to which a set-top box is tuned at particular time intervals of the day and to aggregate such data from multiple set-top boxes. However, such data is necessarily a rough estimate of viewership, as having a set-top box tuned to a channel at a certain time interval does not necessarily equate to users of that set-top box actually viewing the programming on that channel at that time interval. Thus, when determining viewership metrics, the fact that set-top box activity is not synonymous with actual viewership needs to be taken into account.

SUMMARY

According to some implementations, a method is performed at a computer system having one or more processors and memory storing one or more programs executed by the one or more processors. The method includes receiving respective first set-top box (STB) information from a first plurality of STBs. The first STB information received from a respective STB in the first plurality of STBs includes tuning information for the respective STB in the first plurality of STBs, and power status information for a respective display device coupled to the respective STB in the first plurality of STBs and for the respective STB. The method further includes filtering the power status information, and determining a viewership metric for the first plurality of STBs based on the tuning information and the filtered power status information in the first STB information.

According to some implementations, a server system includes one or more processing units, and memory storing one or more programs to be executed by the one or more processing units. The one or more programs include instructions for receiving respective first set-top box (STB) information from a first plurality of STBs. The first STB information received from a respective STB in the first plurality of STBs includes tuning information for the respective STB in the first plurality of STBs, and power status information for a respective display device coupled to the respective STB in the first plurality of STBs and for the respective STB. The one or more programs further include instructions for filtering the power status information, and determining a viewership metric for the first plurality of STBs based on the tuning information and the filtered power status information in the first STB information.

According to some implementations, a non-transitory computer readable storage medium stores one or more programs configured for execution by a computer. The one or more programs include instructions for receiving respective first set-top box (STB) information from a first plurality of STBs. The first STB information received from a respective STB in the first plurality of STBs includes tuning information for the respective STB in the first plurality of STBs, and power status information for a respective display device coupled to the respective STB in the first plurality of STBs and for the respective STB. The one or more programs further include instructions for filtering the power status information, and determining a viewership metric for the first plurality of STBs based on the tuning information and the filtered power status information in the first STB information.

According to some implementations, a method is performed at a computer system having one or more processors and memory storing one or more programs executed by the one or more processors. The method includes receiving set-top box (STB) information from a STB. The STB information includes tuning information for the STB, and power status information for a display device coupled to the STB. The method further includes filtering the power status information.

According to some implementations, a server system includes one or more processing units, and memory storing one or more programs to be executed by the one or more processing units. The one or more programs include instructions for receiving set-top box (STB) information from a STB. The STB information includes tuning information for the STB, and power status information for a display device coupled to the STB. The one or more programs further include instructions for filtering the power status information.

According to some implementations, a non-transitory computer readable storage medium stores one or more programs configured for execution by a computer. The one or more programs include instructions for receiving set-top box (STB) information from a STB. The STB information includes tuning information for the STB, and power status information for a display device coupled to the STB. The one or more programs further include instructions for filtering the power status information.

According to some implementations, a method is performed at a computer system having one or more processors and memory storing one or more programs executed by the one or more processors. The method includes receiving respective first set-top box (STB) information from a first plurality of STBs. The first STB information received from a respective STB in the first plurality of STBs includes a plurality of tuning events for the respective STB in the first plurality of STBs, a plurality of power status events for a respective display device coupled to the respective STB in the first plurality of STBs; and a plurality of power status events for the respective STB in the first plurality of STBs. The method also includes, for a respective STB in the first plurality of STBs, where the respective STB includes a first output connection and a second output connection: determining one or more tuning intervals from the tuning events; determining, from the display device power status events and the STB power status events, one or more power status intervals, the power status intervals associated with the first output connection; and classifying each determined tuning interval as associated with the first output connection or with the second output connection. The method further includes determining a viewership metric for the first plurality of STBs based on the tuning intervals associated with the first output connection and the power status intervals associated with the first output connection for the first plurality of STBs.

According to some implementations, a server system includes one or more processing units, and memory storing one or more programs to be executed by the one or more processing units. The one or more programs include instructions for receiving respective first set-top box (STB) information from a first plurality of STBs. The first STB information received from a respective STB in the first plurality of STBs includes a plurality of tuning events for the respective STB in the first plurality of STBs, a plurality of power status events for a respective display device coupled to the respective STB in the first plurality of STBs; and a plurality of power status events for the respective STB in the first plurality of STBs. The one or more programs also include instructions for, for a respective STB in the first plurality of STBs, where the respective STB includes a first output connection and a second output connection: determining one or more tuning intervals from the tuning events; determining, from the display device power status events and the STB power status events, one or more power status intervals, the power status intervals associated with the first output connection; and classifying each determined tuning interval as associated with the first output connection or with the second output connection. The one or more programs further include instructions for determining a viewership metric for the first plurality of STBs based on the tuning intervals associated with the first output connection and the power status intervals associated with the first output connection for the first plurality of STBs.

According to some implementations, a non-transitory computer readable storage medium stores one or more programs configured for execution by a computer. The one or more programs include instructions for receiving respective first set-top box (STB) information from a first plurality of STBs. The first STB information received from a respective STB in the first plurality of STBs includes a plurality of tuning events for the respective STB in the first plurality of STBs, a plurality of power status events for a respective display device coupled to the respective STB in the first plurality of STBs; and a plurality of power status events for the respective STB in the first plurality of STBs. The one or more programs also include instructions for, for a respective STB in the first plurality of STBs, where the respective STB includes a first output connection and a second output connection: determining one or more tuning intervals from the tuning events; determining, from the display device power status events and the STB power status events, one or more power status intervals, the power status intervals associated with the first output connection; and classifying each determined tuning interval as associated with the first output connection or with the second output connection. The one or more programs further include instructions for determining a viewership metric for the first plurality of STBs based on the tuning intervals associated with the first output connection and the power status intervals associated with the first output connection for the first plurality of STBs.

According to some implementations, a method is performed at a computer system having one or more processors and memory storing one or more programs executed by the one or more processors. The method includes receiving set-top box (STB) information from a STB. The STB includes a first output connection and a second output connection. The STB information includes a plurality of tuning events for the STB, a plurality of power status events for a display device coupled to the STB, and a plurality of power status events for the STB. The method also includes determining one or more tuning intervals from the tuning events; determining, from the display device power status events and the STB power status events, one or more power status intervals associated with the first output connection; and classifying each determined tuning interval as associated with the first output connection or with the second output connection.

According to some implementations, a server system includes one or more processing units, and memory storing one or more programs to be executed by the one or more processing units. The one or more programs include instructions for receiving set-top box (STB) information from a STB. The STB includes a first output connection and a second output connection. The STB information includes a plurality of tuning events for the STB, a plurality of power status events for a display device coupled to the STB, and a plurality of power status events for the STB. The one or more programs also include instructions for determining one or more tuning intervals from the tuning events; determining, from the display device power status events and the STB power status events, one or more power status intervals associated with the first output connection; and classifying each determined tuning interval as associated with the first output connection or with the second output connection.

According to some implementations, a non-transitory computer readable storage medium stores one or more programs configured for execution by a computer. The one or more programs include instructions for receiving set-top box (STB) information from a STB. The STB includes a first output connection and a second output connection. The STB information includes a plurality of tuning events for the STB, a plurality of power status events for a display device coupled to the STB, and a plurality of power status events for the STB. The one or more programs also include instructions for determining one or more tuning intervals from the tuning events; determining, from the display device power status events and the STB power status events, one or more power status intervals associated with the first output connection; and classifying each determined tuning interval as associated with the first output connection or with the second output connection.

BRIEF DESCRIPTION OF THE DRAWINGS

FIG. 5 is a diagram illustrating an example of adjusting tuning information using power status information for a display device, according to some implementations.

DETAILED DESCRIPTION

Consumption (e.g., viewership) metrics may be determined for content (e.g., television programming) distributed to set-top boxes using channel tuning information from the set-top boxes. Simply using channel tuning information may yield imprecise consumption metrics, as channel tuning does not necessarily equate to actual consumption. More precise metrics may be determined by accounting for the power status of the display devices that are coupled to the set-top boxes and are responsible for displaying the content output from the set-top boxes. In some implementations, channel tuning information may be adjusted based on the power status information of display devices, and the adjusted channel tuning information is used to determine the consumption metrics. In some implementations, an adjustment factor is determined based on consumption metrics that account for the display device power status information, and the factor may be used to adjust consumption metrics for set-top boxes where the power status information for the corresponding display device are not available.

Figure 1:
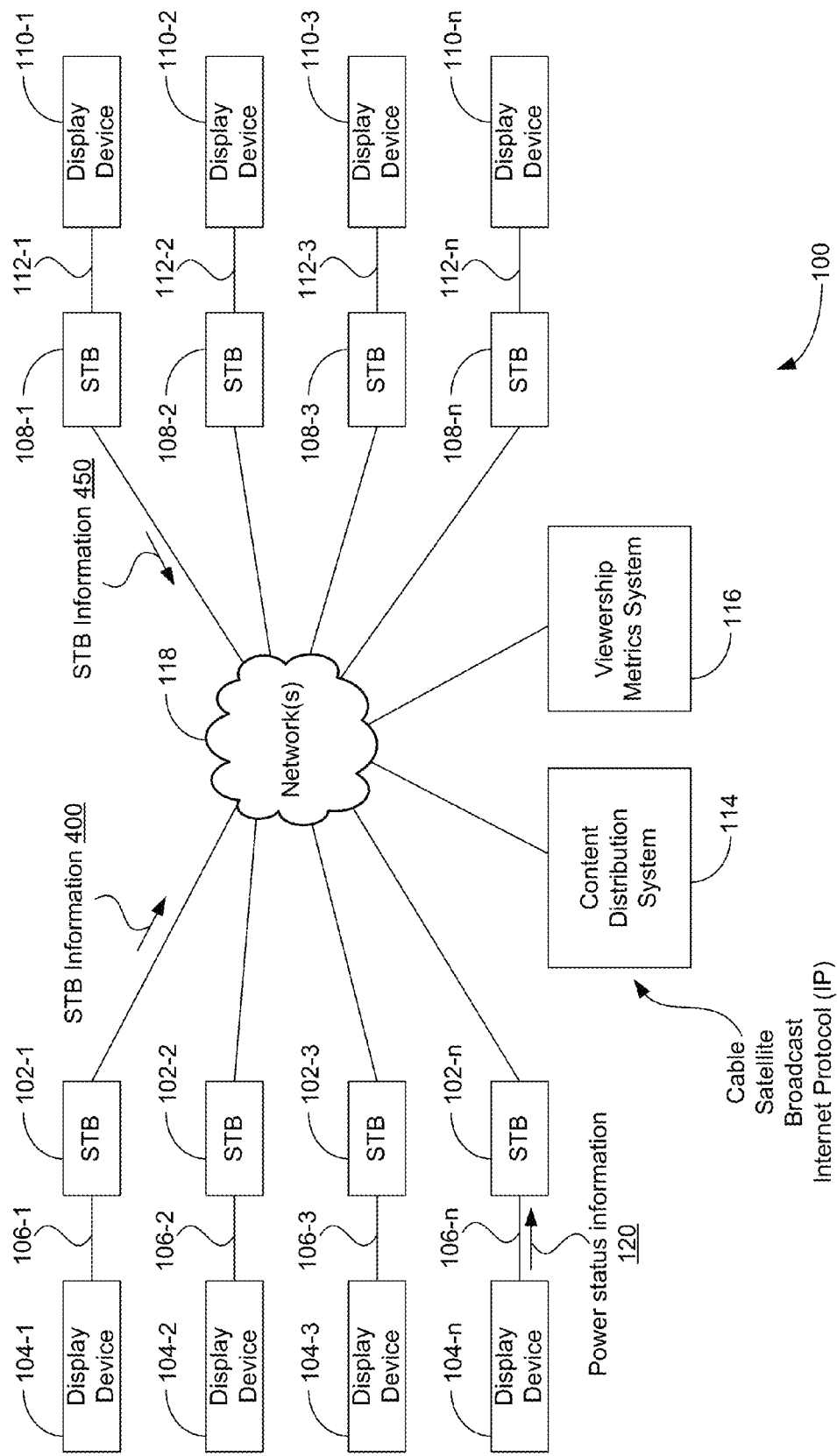
FIG. 1 is a block diagram illustrating a content distribution environment, according to some implementations.

FIG. 1 is a block diagram illustrating a content distribution environment, according to some implementations. The content distribution environment 100 includes multiple set-top boxes (STBs) 102-1 thru 102-*n* and 108-1 thru 108-*n*. The STBs 102-1 thru 102-*n* are coupled to display devices 104-1 thru 104-*n* by connections 106-1 thru 106-*n*, respectively. The STBs 108-1 thru 108-*n* are coupled to display devices 110-1 thru 110-*n* by connections 112-1 thru 112-*n*, respectively. STBs 102 and 108 are communicatively coupled to a content distribution system 114 and a viewership metrics system 116 by one or more communications networks 118 (e.g., the Internet). As used in this specification, a set-top box (e.g., STBs 102, 108) is a device that is configured to receive external signals (e.g., cable television signals, satellite television signals, broadcast signals, Internet Protocol television signals) and output content carried in the external signals (e.g., to another device, such as a display device, audio speakers, etc.). In some implementations, a set-top box is a conventional, dedicated set-top box; a hybrid device, such as a digital video recorder (DVR) with set-top box capabilities as described herein; a personal computer with set-top box capabilities, an internet-connected media streaming device with set-top box capabilities, or a game console with set-top box capabilities.

A respective STB 102 receives signals containing content (e.g., television programming, video, audio, etc.) from the content distribution system 114, processes the received signals (e.g., decrypting and/or decoding the signal), and outputs the content to a display device 104 through a connection 106. In some implementations, the display device 104 is a computer monitor or a television. In some implementations, the content distribution system 114 is one or more of a cable, satellite, broadcast, and/or Internet Protocol content distribution system (e.g., cable television system, satellite television system, over-the-air broadcast television system, Internet Protocol television system, etc.).

In some implementations, the signals received from the content distribution system 114 include multiple channels. The STB 102 tunes to a particular channel in the signals to receive the content that may be included in the tuned channel. The STB 102 may tune to any particular channel in the signals in accordance with end user inputs (e.g., an end user changes channels using a remote control) or pre-programmed instructions (e.g., an end user sets the STB 102 in advance to tune to a channel at a specified time in order to digitally record content on that channel).

The connection 106 is a connection or interface that communicatively couples a STB 102 and a display device 104, and enables data transmission between the STB 102 and the display device 104. Data is transmitted between the STB 102 and the display device 104 in accordance with one or more protocols suitable for data transmission over the connection 106. In some implementations, the connection 106 is a wired connection (e.g., a High-Definition Multimedia Interface (HDMI) connection, or another wired digital display connection that provides power status information). In some other implementations, the connection 106 is a wireless connection, through which content may be wirelessly streamed from the STB 102 to the display device 104.

The STBs 102 log tuning information regarding channel tuning activity on the STBs 102. In some implementations, the logged "raw" tuning information for a respective STB 102 includes distinct time intervals, and for each interval, information regarding a channel to which the respective STB 102 is tuned during that interval. For example, the raw tuning information may include a first time interval during which the STB is tuned to channel A, a second time interval during which the STB is tuned to channel B, and a third time interval during which the STB is tuned to channel A. There may be a gap between any two chronologically successive intervals. In some implementations, a gap between chronologically successive intervals is presumed to be an interval when the STB is not tuned to a channel (e.g., because the STB is powered off or on standby; because the STB is outputting an emergency broadcast; because the STB is performing reboot, diagnostics, or software or firmware update operations; etc.).

In some implementations, the tuning information 102 may be logged and/or reported by an STB 102 as events, with each event accompanied by a timestamp. For example, when the STB 102 tunes to a channel, that channel-tuning may be reported as an event, with a particular timestamp. Tuning to a different channel may be reported as another event, with a particular timestamp. The pertinent time intervals may be derived from a time-ordered sequence of the events. For example, the time between successive channel tuning events may be considered to be an interval when the STB 102 is tuned to a particular channel.

The STBs 102 collect power status information 120 for the respective display devices 104 that are coupled to the STBs 102. For example, STB 102-1 collects power status information 120 for display device 104-1 that is coupled to STB 102-1; STB 102-2 collects power status information 120 for display device 104-2 that is coupled to STB 102-2; and so on. In some implementations, the STB 102 is enabled to collect power status information 120 for the display device 104 by the type of the connection 106 coupling the STB 102 to the display device 104 and the associated protocols for communicating through the connection 106. For example, HDMI interfaces and protocols associated with the HDMI interface support power status signals or information transmitted from the display device 104 to a STB 102 coupled to the display device 104 by a HDMI connection. At least, in order to enable collection of display device power status information 120 by a STB 102, the connection 106 allows for two-way data transmission (as opposed to merely one-way transmission from the STB to the display device). In some implementations, the reporting and collection of display device power status information through HDMI interfaces is implemented in accordance with the Consumer Electronics Control specification within the HDMI specification.

In some implementations, the power status information 120 for a respective display device 104 includes information regarding time intervals during which the respective display device 104 is powered on; times outside of these intervals are presumed to be intervals when the display device 104 is powered off. In some other implementations, the power status information 120 for a respective display device 104 includes information regarding time intervals during which the respective display device 104 is powered on and time intervals during which the respective display device is powered off. In some further implementations, the power status information 120 for a respective display device 104 includes information regarding respective time intervals during which the respective display device 104 is powered on, powered off, or on standby.

In some implementations, the power status information 120 is reported by the display device 104 as power status events, each with accompanying timestamps. For example, the time when a display device 104 is powered on, that may be reported as an event with an accompanying timestamp. Similarly, when the display device 104 is powered off or goes into standby, these may be reported as distinct events as well. The pertinent intervals (e.g., intervals when the display device is on, etc.) may be derived from a chronologically ordered sequence of the events. For example, the time between a power-on event and a successive power-off event may be considered to be an interval when the display device was powered-on. In some implementations, a power status event also includes an indication of the connection 106 through which the event was reported to the STB 102 (e.g., that the event is reported through HDMI or another connection).

Figure 10:
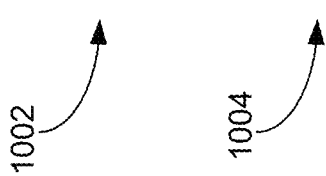
FIG. 10 illustrates example set-top box power status events and display device power status events sent from a set-top box, according to some implementations.

Examples of display device power status events sent by a set-top box are illustrated in FIG. 10. In FIG. 10, the display device power status events 1004 are labeled as "display_powerstate," with values "display_OFF" or "display_ON," and each event has a respective timestamp. In some implementations, a display device power status event also includes an indication, in the label or the value for example, of the type of connection (e.g., HDMI, analog) connecting the STB to the display device. Also illustrated in FIG. 10 are set-top box power status events 1002, labeled as "stb_powerstate" and having values "outOfStandby," "inStandby," "powerOff," or "powerOn."

A respective STB 102 transmits its tuning information and the power status information for the display device 104 coupled to the respective STB 102 to a viewership metrics system 116. The viewership metrics system 116 receives the tuning information and the power status information from the STBs 102, stores the received information, and may process them. Examples of processing of the received information include determining one or more viewership metrics for programming distributed by content distribution system 114 using the information received from the STBs 102, which are described further below. In some implementations, the viewership metrics include any metric that may be derived from a combination of time intervals and channels to which set-top boxes are tuned during those intervals. Examples of viewership metrics include an estimated or projected number of impressions for a program, total viewing time, number of tune-ins and tune-outs, number of visits during a time interval, and so on. The tuning information and/or the power status information may be cross-referenced with a mapping of channels to content providers (e.g., television networks) and/or a mapping of times and channels/content providers to programs to derive viewership metrics for particular content providers and/or particular programs.

In some implementations, viewership metrics are anonymized and no specific user or household is identifiable or trackable from the viewership metrics. In some implementations, a user or STB owner may opt out of having the tuning information and power status information from their STB used in viewership metrics determinations, or the user or STB owner must opt in before the tuning information and power status information from their STB may be used in viewership metrics determinations.

In some implementations, in addition to the tuning information and the power status information, a STB 102 sends additional information to the viewership metrics system 116. The additional information may include power status information for the STB 102, geographic location information of the STB 102, etc. In some implementations, the geographic location information indicates where the STB 102 is located (e.g., city and state, zip/postal code, etc.). For convenience, the tuning information, the power status information (if available), and any additional information sent from a STB 102 to the viewership metrics system 116 may be collectively referred to as STB information.

In some implementations, a STB 102 sends tuning information, power status information, and any additional information to the viewership metrics system 116 periodically. For example, the STB 102 sends the information to the viewership metrics system 116 weekly.

STBs 108, display devices 110, and connections 112 are similar to STBs 102, display devices 104, and connections 106, respectively, and operate analogously, except that the STB information transmitted by STBs 108 does not include power status information for the display devices 110 coupled to the STBs 108; STBs 108 do not collect power status information for the display devices 110 coupled to the STBs 108. In some implementations, the STBs 108 do not collect power status information for display devices 110 because the STBs 108, the display devices 110, and/or the connections 112 are not configured to support collection of the power status information (e.g., the connection 112 is a one-way connection, such as a component video connection or a composite video connection; the display device 110 does not support reporting of power status; the STB 108 and/or the display device 110 lacks the protocol to report power status information; etc.). In some other implementations, the non-collection of the power status information is due to the feature being disabled at the display device 110 (i.e., the display device 110 doesn't report power status information) or at the STB 108 (e.g., the STB 108 ignores any power status information reported by the display device 110).

A content distribution system 114 distributes content (e.g., television programming) to STBs 102, 108 through the network(s) 118. In some implementations, the network(s) 118 include one or more of fiber optic cable networks, coaxial cable networks, satellite networks, copper-wire based networks (e.g., digital subscriber line (DSL), phone line, WAN, LAN, the Internet, etc.), wireless networks (e.g., Wi-Fi), or any mix or combination of the above. In some implementations, the content distribution system 114 is a cable television system, satellite television system, broadcast television system, a system that delivers television programming through fiber optic networks, or an Internet Protocol television (IPTV) system.

In some implementations, STBs 102 and 108 are communicatively coupled to content distribution system 114 through the network(s) 118 in a manner that enables two-way communication between the STBs 102, 108 and the content distribution system 114. In some implementations, the content distribution system 114 includes one or more computing devices (e.g., servers).

A viewership metrics system 116 receives STB information from STBs 102 and 108 and uses the received STB information to determine viewership metrics for content distributed by the content distribution system 114. In some implementations, the viewership metrics system 116 includes one or more computing devices (e.g., servers).

In some implementations, the viewership metrics system 116 is a part of the content distribution system 114. For example, the viewership metrics system 116 is integrated with the content distribution system 114. STB information is transmitted from STBs 102 and 108 to an integrated system that includes the viewership metrics system 116 and the content distribution system 114.

In some other implementations, the content distribution system 114 and the viewership metrics system 116 are distinct systems. For example, the content distribution system 114 may be operated by one entity (e.g., the cable or satellite television operator) and the viewership metrics system 116 is operated by another entity. Alternatively, the content distribution system 114 and the viewership metrics system 116 are distinct systems operated by a common entity. The viewership metrics system 116 communicates with the content distribution system 114 to access whatever information is needed to determine viewership metrics. STB information is transmitted from STBs 102 and 108 to the viewership metrics system 116 either directly (i.e., without the content distribution system 114 as an intermediary) or through the content distribution system 114.

In some implementations, STBs 102 or 108 are coupled to the networks 118 using multiple connections. For example, an STB 102 or 108 may connect to the networks 118 using a satellite connection and an Ethernet connection. The satellite connection may be used to receive content signals from the content distribution system 114, and the Ethernet connection is used to transmit and receive data not directly related to content distribution (e.g., diagnostic information, billing information, STB information, any other signal or data that is not the actual content signal itself) to/from content distribution system 114 and viewership metrics system 116.

Figure 2A:
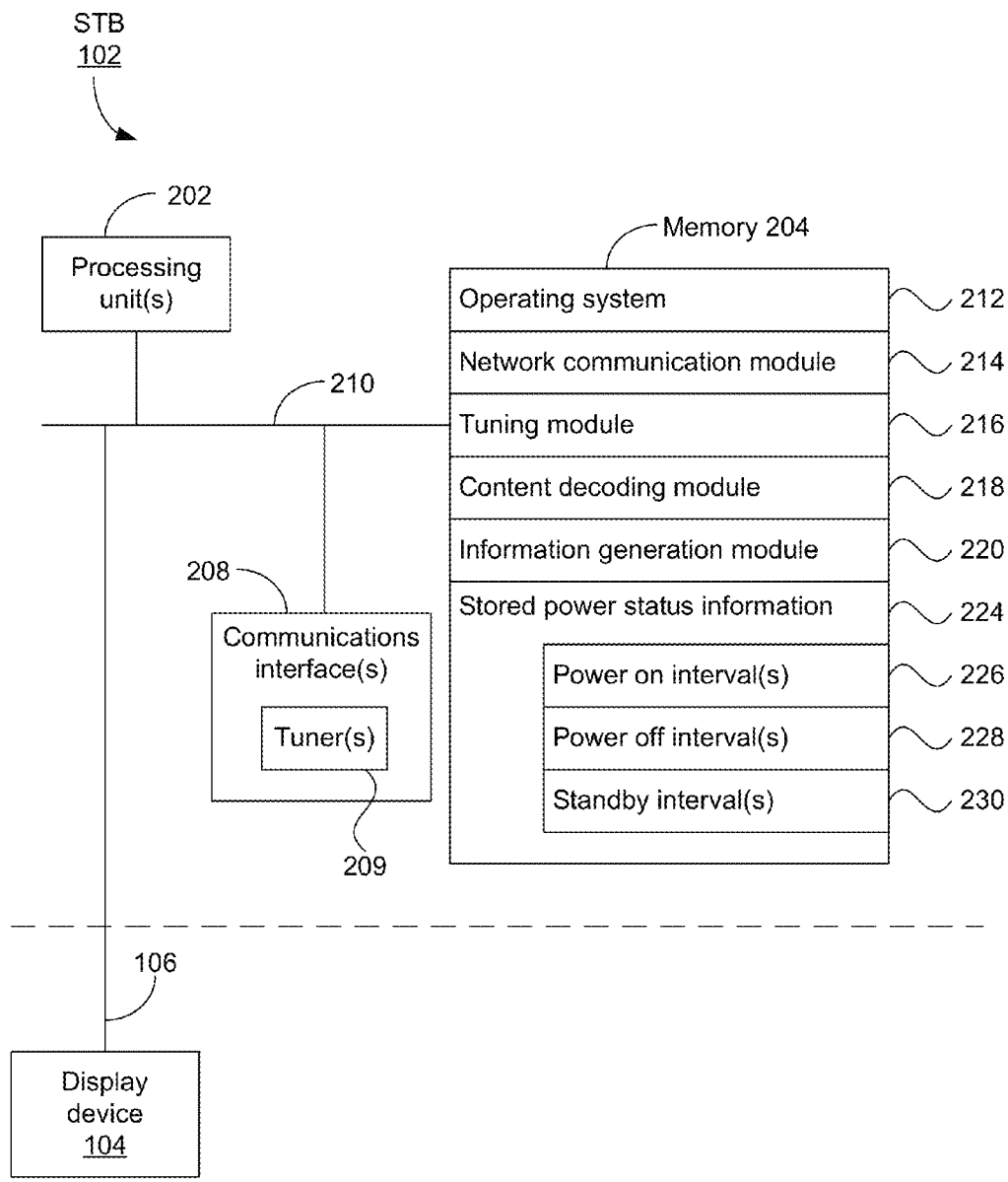
FIGS. 2A-2B are block diagrams illustrating set-top boxes, according to some implementations.
Figure 2B:
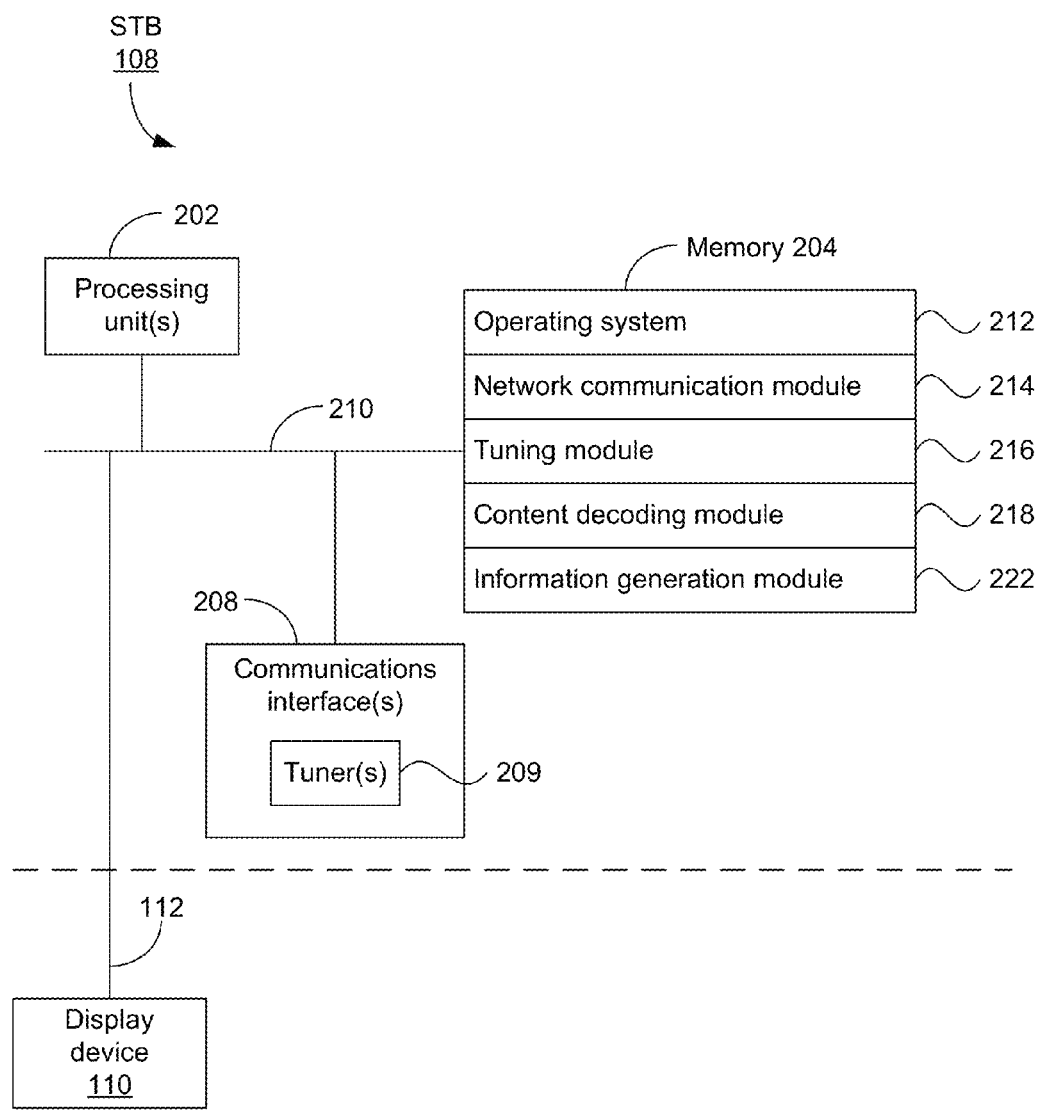

FIGS. 2A-2B are block diagrams illustrating set-top boxes, according to some implementations. In FIG. 2A, a STB 102 typically includes one or more processing units (CPU's) 202, one or more network or other communications interfaces 208, memory 204, and one or more communication buses 210 for interconnecting these components. In some implementations, the communications interfaces 208 includes one or more tuners 209 for tuning to channels in content signals transmitted from content distribution system 114.

In some implementations, the communication bus 210 leads to a connection 106, which connects the STB 102 to a display device 104. In some implementations, the connection 106 is an HDMI connection. In some other implementations, the connection 106 is a wireless connection connecting the display device 104 to a communications interface 208.

Memory 204 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 204 may optionally include one or more storage devices remotely located from the CPU(s) 202. Memory 204, or alternately the non-volatile memory device(s) within memory 204, comprises a non-transitory computer readable storage medium. In some implementations, memory 204 or the computer readable storage medium of memory 204 stores the following programs, modules and data structures, or a subset thereof:

- an operating system 212 that includes procedures for handling various basic system services and for performing hardware dependent tasks;
- a network communication module 214 that is used for connecting the STB 102 to other computers or systems (e.g., content distribution system 114, viewership metrics system 116) via the one or more communication network interfaces 208 (wired or wireless) and one or more communication networks, such as the Internet, other wide area networks, local area networks, metropolitan area networks, cable televisions systems, satellite television systems, IPTV systems, and so on;
- a tuning module 216 for tuning to channels in signals received from the content distribution system 114;
- a content decoding module 218 for decoding content signals received from the content distribution system 114 and outputting the content in the decoded signals to the display device 104;
- an information generation module 220 for collecting and generating STB information; and
- stored power status information 224, which stores the power status information 120 received from the coupled display device 104.

The stored power status information 224 includes one or more power on intervals 226 specifying one or more time intervals during which the coupled display device 104 is powered on; and optionally one or more power off intervals 228 specifying one or more time intervals where the coupled display device 104 is powered off, and/or one or more standby intervals 230 specifying one or more time intervals where the coupled display device 104 is on standby.

In FIG. 2B, a STB 108 has similar components to the STB 102. For example, the STB 108 includes one or more processing unit(s) 202, a communication bus 210, one or more network or other communication interfaces 208, one or more tuner(s) 209, and memory 204. The memory includes an operating system 212, a network communication module 214, a tuning module 216, and a content decoding module 218.

The STB 108 also includes components that are similar to, but different from, analogous components in the STB 102. For example, the STB 108 includes a connection 112 connecting the communication bus 210 to a display device 110. Also, the STB 108 includes an information generation module 222.

In some implementations, the connection 112 and display device 110 differs from the connection 106 and the display device 104, respectively, in that the connection 112 and/or the display device 110 does not support reporting of power status information by the display device 110 to the STB 108. For example, the connection 112 may merely be a component or composite video connection and not a HDMI connection.

In some implementations, the information generation module 222 differs from the information generation module 220 in the STB 102 in that the information generation module 222 does not collect power status information 120 from the display device 110. For example, the information generation module 222 may not support the protocols used for power status information reporting.

Figure 3:
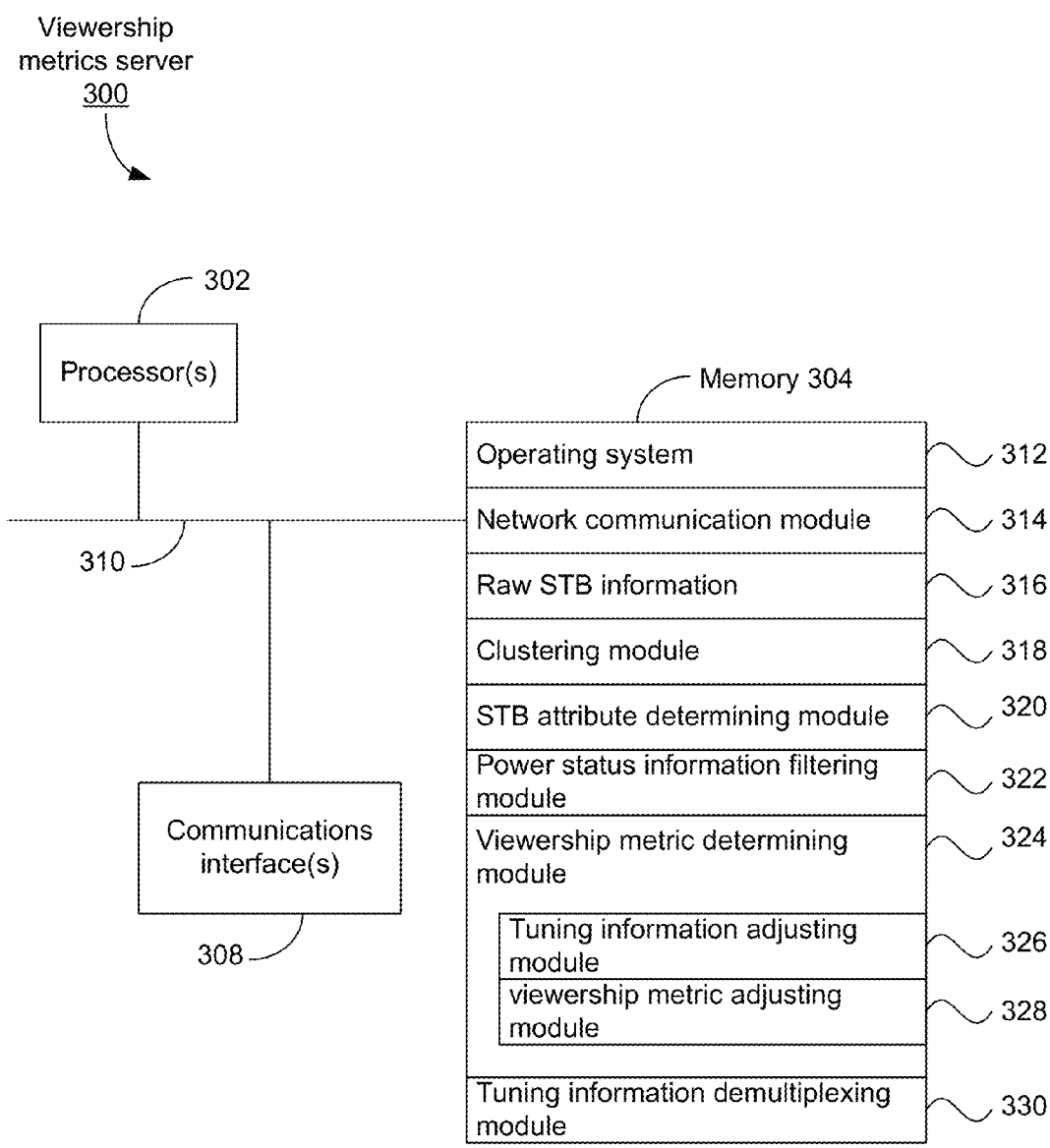
FIG. 3 is a block diagram illustrating a server in a viewership metrics system, according to some implementations.

FIG. 3 is a block diagram illustrating a computing device (e.g., a server) in a viewership metrics system 116, according to some implementations. The server 300 typically includes one or more processing units (CPU's) 302, one or more network or other communications interfaces 308, memory 304, and one or more communication buses 310 for interconnecting these components.

Memory 304 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 304 may optionally include one or more storage devices remotely located from the CPU(s) 302. Memory 304, or alternately the non-volatile memory device(s) within memory 304, comprises a non-transitory computer readable storage medium. In some implementations, memory 304 or the computer readable storage medium of memory 304 stores the following programs, modules and data structures, or a subset thereof:

- an operating system 312 that includes procedures for handling various basic system services and for performing hardware dependent tasks;
- a network communication module 314 that is used for connecting the server 300 to other computers or systems (e.g., content distribution system 114; STBs 102, 108) via the one or more communication network interfaces 208 (wired or wireless) and one or more communication networks, such as the Internet, other wide area networks, local area networks, metropolitan area networks, cable televisions systems, satellite television systems, IPTV systems, and so on;
- raw STB information 316 received from STBs 102 and 108, including STB information 400 and 450 described below with reference to FIGS. 4A-4B;
- a clustering module 318 for clustering STB information based on attributes of corresponding set-top boxes;
- a STB attribute determining module 320 for determining one or more attributes (e.g., demographic attributes, location attributes, etc.) associated with set-top boxes;
- a power status information filtering module 322 for filtering power status information; and
- a viewership metric determining module 324 for determining viewership metrics from raw STB information 316.

In some implementations, the viewership metric determining module 324 includes a tuning information adjusting module for adjusting raw tuning information using power status information of display devices, and viewership metric adjusting module 328 for adjusting viewership metrics for STBs that do not collect display device power status information based on viewership metrics for STBs that do collect display device power status information.

FIGS. 2A-2B and 3 are intended more as functional descriptions of the various features which may be present in a set of devices or computer systems than as a structural schematic of the implementations described herein. In practice, and as recognized by those of ordinary skill in the art, items shown separately could be combined and some items could be separated. For example, some items shown separately in these figures could be implemented on single servers and single items could be implemented by one or more servers. The actual number of systems used to implement determination of viewership metrics and how features are allocated among them will vary from one implementation to another.

Figure 4A:
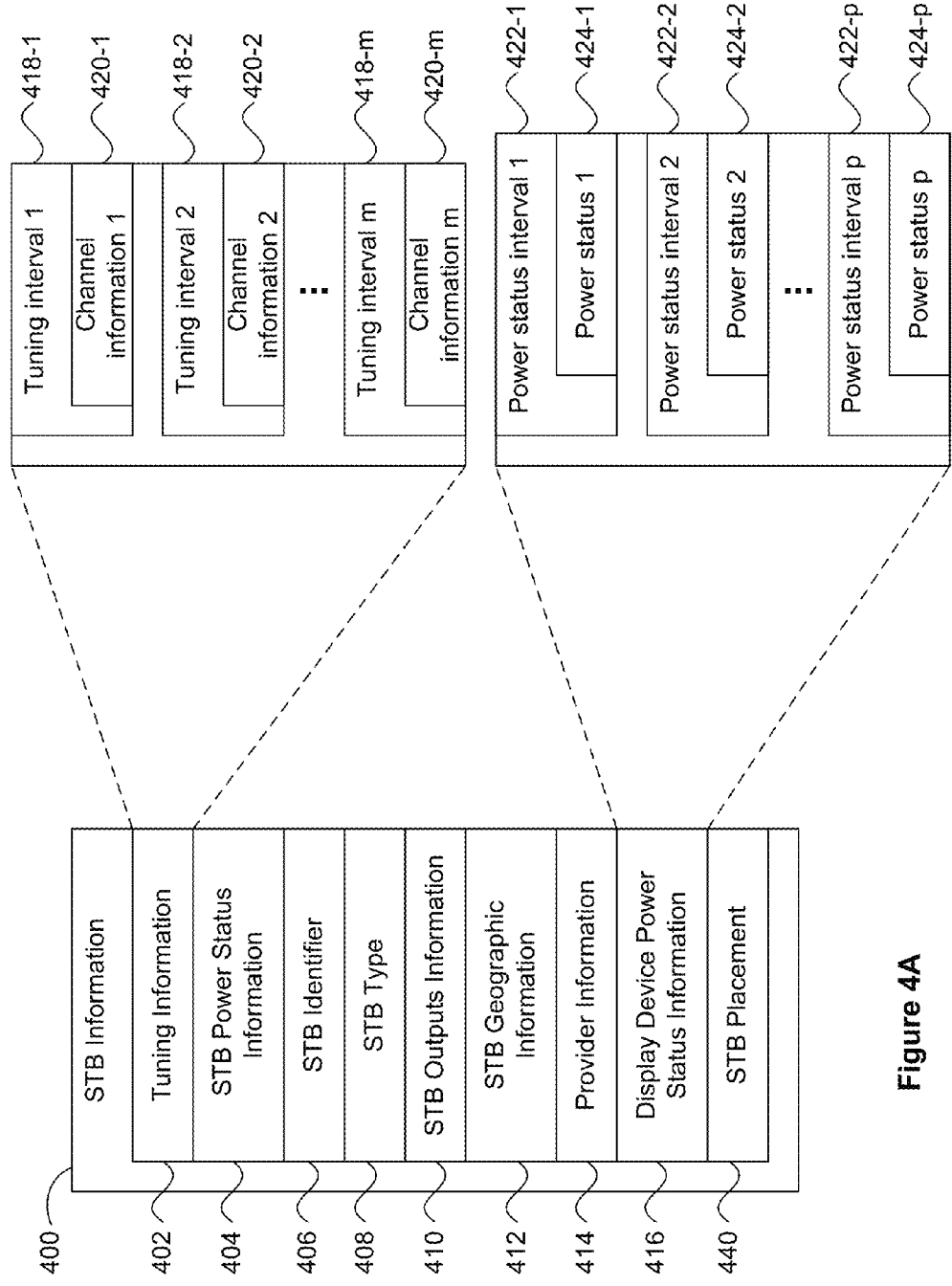
FIGS. 4A-4B are diagrams illustrating data components of STB information sent by set-top boxes, according to some implementations.
Figure 4B:
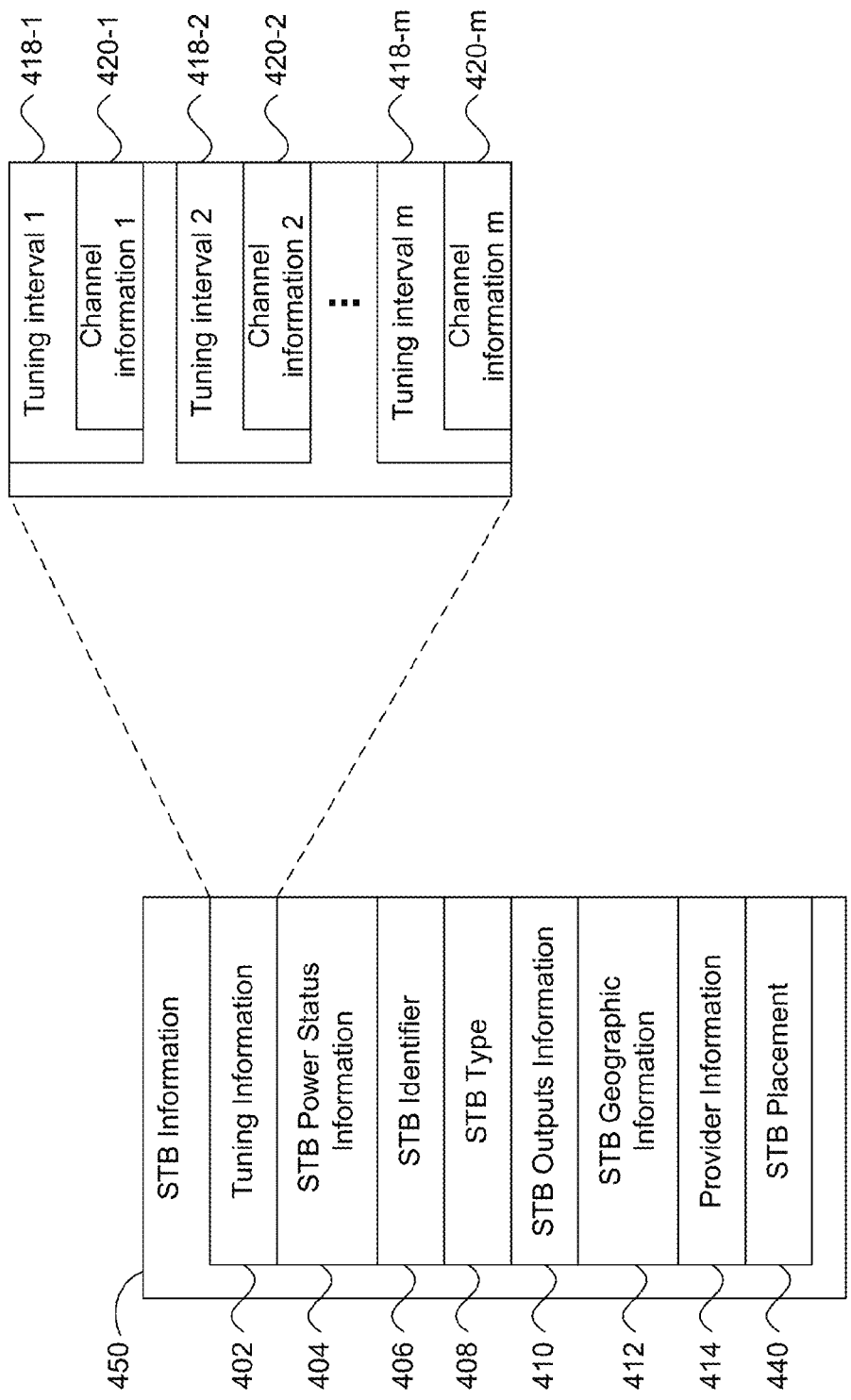

FIGS. 4A-4B are diagrams illustrating data components of STB information sent by set-top boxes, according to some implementations. STB information 400, illustrated in FIG. 4A, is sent from a STB 102 to the viewership metrics system 116, as shown in FIG. 1. STB information 450, illustrated in FIG. 4B, is sent from a STB 108 to the viewership metrics system 116, as shown in FIG. 1. Multiple STBs 102 send respective STB information 400 to the viewership metrics system 116, and analogously for STBs 108 with respect to respective STB information 450. In some implementations, a STB 102 or 108 may send STB information 400 and 450, respectively, to the viewership metrics system 116 periodically (e.g., weekly, bi-weekly, monthly). STB information 400 and 450 may be stored as raw STB information 316 by the viewership metrics server 300.

The STB information 400 sent by a STB 102 includes tuning information 402 and display device power status information 416. The tuning information 402 includes one or more chronologically ordered tuning intervals 418 and for each tuning interval, channel information 420. A tuning interval 418 specifies a time interval during which the sending STB 102 was tuned to a channel indicated in the channel information 420.

The display device power status information includes one or more chronologically ordered power status intervals 422 and for each power status interval 422, a power status 424. A power status interval 422 specifies a time interval during which a display device 104 coupled to the sending STB 102 has the power status (e.g., "powered on") specified in the power status 424.

In some implementations, the display device power status information 416 includes power status intervals 422 in which the power status 424 specifies a "powered on" status but not intervals specifying other statuses; times outside of the intervals 422 are not included in the power status information 416 but are presumed to be intervals where the display device 104 is powered off. In some other implementations, the display device power status information 416 includes power status intervals 422 where the power status 424 is "powered on" as well as intervals 422 with other power statuses 424 (e.g., "powered off," "standby").

In some implementations, the tuning information 402 and the display device power status information 416 include events with accompanying timestamps, rather than intervals. For example, the tuning information 402 may include one or more channel tuning events where the STB tunes to a respective channel and respective timestamps of when those events occurred. Similarly, the display device power status information 416 may include one or more power status events (e.g., display power status events 1004, FIG. 10) where the display device changes power status to on, off, or standby, and respective timestamps of when those events occurred. The viewership metrics system 116 may derive the pertinent intervals from the chronological sequences of these events along respective timelines (e.g., tuning intervals derived from the chronological sequence of channel tuning events, power status intervals derived from the chronological sequence of power status events). For example, an interval [display_on, display off], where "display_on" represents a power-on event, and "display_off" represents a power-off event, indicates an interval where the display device was powered on at the timestamp of the "display_on" event and powered off at the timestamp of the "display_off" event.

STB information 450, as they are sent from STBs 108, are similar in content to STB information 400, with the difference being that STB information 450 does not include display device power status information 416.

In some implementations, the STB information 400 or 450 additionally includes:

STB power status information 404, which identifies the power status (e.g., power on, power off, standby) of the sending STB at specified time intervals;

STB identifier 406, which uniquely identifies the sending STB;

STB type 408, which identifies the model of the sending STB;

STB outputs information 410, which identifies the outputs available on the sending STB and the status of those outputs (e.g., whether the output is connected to a device);

STB geographic information 412, which identifies the geographic location where the sending STB is deployed;

provider information 414, which identifies the content distribution system 114 providing the content signals to the sending STB; and STB placement 440 specifying a location of the sending STB within a household (e.g., living room, family room, bedroom, etc.).

In some implementations, the STB power status information 404, in conjunction with the display device power status information 416, provides additional information regarding use of the STB and the display device. Similar to the display device power status information 416, the STB power status information may be reported as events with respective timestamps (e.g., STB power status events 1002, FIG. 10), from which time intervals may be derived. The STB power status information 404 may be combined with the display device power status information 416 to derive particular time intervals. For example, the intervals [display_on, display_off] and [display_on, STB_off] may be derived. The interval [display_on, display_off] indicates a time interval when the display was powered on and then powered off sometime later (and the STB power status did not change during the interval). The interval [display_on, STB_off] indicates a time interval when the display was powered on and then the STB was powered off sometime later (while the display remained powered-on). If multiple overlapping intervals can be formed from a set of display_on, display_off, and STB_off events, the interval with the shortest duration is selected. Other intervals based on display device power status events, STB power status events, or combinations of such, may be derived. A timeline of intervals may also be derived; this timeline provides more fine-grained information on usage of the display device and of the STB. For example, intervals where the display device is off but the STB is on may be treated as an interval when the user is not viewing content (and thus whatever channel tuning that occurs then are not reliable indicators of actual viewership). This timeline of intervals may also be used to determine certain metrics, such as an average TV-on time per household or per STB.

In some implementations, the STB power status and display power status events include indicators of the pertinent output. For example, events related to a display device connected to the STB by an HDMI connection include some indication that the event is associated with HDMI. When pairing a display_on event with a display_off event to derive an interval, both the display_on event and the display_off event should be associated with the same output connection (e.g., both are associated with HDMI). Intervals derived from events associated with the connection may be put into a timeline of intervals separately from intervals derived from events associated with a different connection. For example, [display_on, display_off] and [display_on, STB_off] derived from display_on events and display_off events associated with an HDMI connection are put on a separate timeline from similar intervals derived from events with a different connection (e.g., an analog connection).

An STB power status event or a display device power status event may have a timestamp that seems nonsensical (e.g., a "zero time" timestamp). Such timestamps may be the result of the reporting set-top box not having locked onto signals (which include time information) from the content distribution system 114 when recording the event, and thus reporting the event with a nonsensical or improper timestamp. STB or display device power status events with improper timestamps may be disregarded (e.g., removed from the STB power status information 404 or display device power status information 416, respectively, by viewership metrics system 116). For example, in FIG. 10, the last display_powerstate event, with the timestamp of "1900-01-01 00:00:00GMT" has an improper timestamp and thus may be removed.

In some implementations, these additional pieces of information are used to determine the demographics and other attributes of the sending STB and of the user(s) of the sending STB. It should be appreciated that these additional pieces of information are optional. If and how these additional pieces of information are used in the determination of viewership metrics will vary by implementation. In instances where any of these pieces of information is not used in the determination of viewership metrics, the sending of those pieces of information may be omitted. In some implementations, an STB may be opted out, by the user or STB owner, of sending any of these additional pieces of information to the viewership metrics system 116, e.g., for privacy reasons. In some other implementations, an STB must be opted in in order to send any of these additional pieces of information. In some implementations, similar opt-out or opt-in choices may be with respect to tuning information 402 and/or display device power status information 416, effectively controlling whether, or what, information from the STB is used in the viewership metrics determination.

The viewership metric determining module 324 uses the tuning information 402 in STB information 450 to determine viewership metrics for content with respect to STBs 108. For example, the tuning information 402 from the STBs 108 is aggregated to determine viewership metrics with respect to STBs 108.

The viewership metric determining module 324 uses the tuning information 402 and display device power status information 416 in STB information 400 to determine viewership metrics of content with respect to STBs 102. The display device power status information 416 is used to adjust the tuning information 402 to account for times when the display devices coupled to the STBs 102 are not powered on (and therefore, presumably, nobody is actually watching the content output by the STBs 102). The adjusted tuning information is aggregated to determine viewership metrics in an analogous manner as tuning information 402 from the STBs 108 is used, as described above. The viewership metrics determined using the adjusted tuning information has an advantage of being more accurate than viewership metrics determined using just tuning information, as the adjusted tuning information accounts for times when a STB is tuned to a channel but the output display device is powered off (and thus presumably there is no actual viewership associated with the tuning of the STB to the channel).

FIG. 5 is a diagram illustrating an example of adjusting tuning information using power status information for a display device, according to some implementations. FIG. 5 shows a tuning information timeline 502 for an STB 102. The tuning information timeline 502 includes tuning intervals 508, 510, and 512, which correspond to respective tuning intervals 418 that are included in an instance of STB information 400. FIG. 5 also includes a power status information timeline 504 for a display device 104 coupled to the STB 102. The power status information timeline 504 includes a "powered-on" power status interval 514, which corresponds to a respective power status interval 422, where the corresponding power status 424 is "powered-on," that is included in an instance of STB information 400. An intersection of the tuning information timeline 502 and the power status information timeline 504 yields an adjusted tuning information timeline 506. Tuning interval 508 is reduced to adjusted tuning interval 516, which starts at substantially the same time as the power status interval 514; the portion of the tuning interval 508 that does not overlap with the power status interval 514 is removed. Interval 510 is preserved in the adjusted tuning information timeline 506, as it overlaps completely with power status interval 514. The tuning interval 512 is removed entirely, as none of it overlaps with a power status interval on the power status information timeline representing a "powered-on" status. The adjusted tuning intervals in the adjusted tuning information timeline 506 from multiple STBs may be aggregated to determine viewership metrics for the multiple STBs.

FIG. 5 shows tuning interval 510 ending prior to power status interval 514 ending. The portion of the power status interval 514 that does not overlap tuning interval 510 represents a time interval where the display device is powered on but the STB is not tuned to a channel. Examples of situations where this occurs include the user putting the STB on power-off or standby but does not do the same for the display device; the STB receiving and outputting an emergency broadcast; and the STB engaging in reboot, diagnostics, or update operations.

In some implementations, a timeline that includes time intervals having value pairs of display device power status and STB power status (e.g., the timeline described above with respect to FIGS. 4A-4B), may be used in lieu of the power status information timeline 504. The resulting adjusted tuning information timeline 506 may include intervals where both the display device and the STB are powered on and the STB was tuned to a channel (i.e., intersection of a tuning interval with an interval where the display device power status is powered-on and the STB power status is powered-on.

In some implementations, the viewership metrics determined using the adjusted tuning intervals may be further used to adjust viewership metrics determined using tuning information from STBs that do not send display device power status information (STBs 108). An adjustment or correction factor may be defined as a ratio of a viewership metric determined from the adjusted tuning intervals (e.g., the intervals in adjusted tuning information timeline 506), for a set of STBs that send display device power status information (e.g., STBs 102), to the same viewership metric determined from the raw tuning information (e.g., the intervals in tuning information timeline 502) for the same set of STBs. Viewership metrics determined from tuning information sent from a set of STBs that do not send display device power status information (e.g., STBs 108) may be multiplied by the ratio to determine adjusted viewership metrics for that set of STBs.

In some implementations, at least some of the STBs 102 include digital video recording (DVR) capabilities, and viewership metrics for a piece of content include viewership of DVR recordings of the piece of content (as part of the overall viewership of the piece of content and/or as a distinct metric). Playback intervals of DVR recorded content may be adjusted to account for the display device power status, analogous to the adjustment of tuning intervals described above. In some implementations, intervals during which content is recorded by an STB using the DVR capabilities of the STB are not adjusted as the tuning intervals are adjusted as described above.

In some implementations, at least some set-top boxes have a logical output that is associated with multiple physical outputs. For example, a set-top box may have a logical "output 0" that is associated with both an HDMI connection and an analog (e.g., RF) connection. Tuning events output by either the HDMI or the analog connection on a set-top box are both logged as tuning events on "output 0" of the set-top box. Thus, prior to the adjustment of the tuning intervals in tuning information 502, tuning intervals in tuning information 502 are distinguished or classified in order to separate tuning intervals that are (or are likely to be) associated with one connection from tuning intervals with another connection. In some implementations, for a particular set-top box, a criterion for distinction or classification is that a tuning interval is associated with an HDMI connection if: 1) the tuning interval overlaps a "powered-on" power status interval that is associated with an HDMI connection, and 2) the start time of the tuning interval is not earlier than the start time of the overlapping power status interval by more than a predefined amount of time (e.g., 5 minutes), referred to below as a "lookback" period. Thus, for example, for a particular set-top box, a tuning interval that does not overlap a "powered-on" power status interval associated with an HDMI connection, or that overlaps a "powered-on" power status interval that is associated with an HDMI connection but starts before the overlapping "powered-on" by more than the "lookback" period, is not associated with the HDMI connection.

Figure 11:
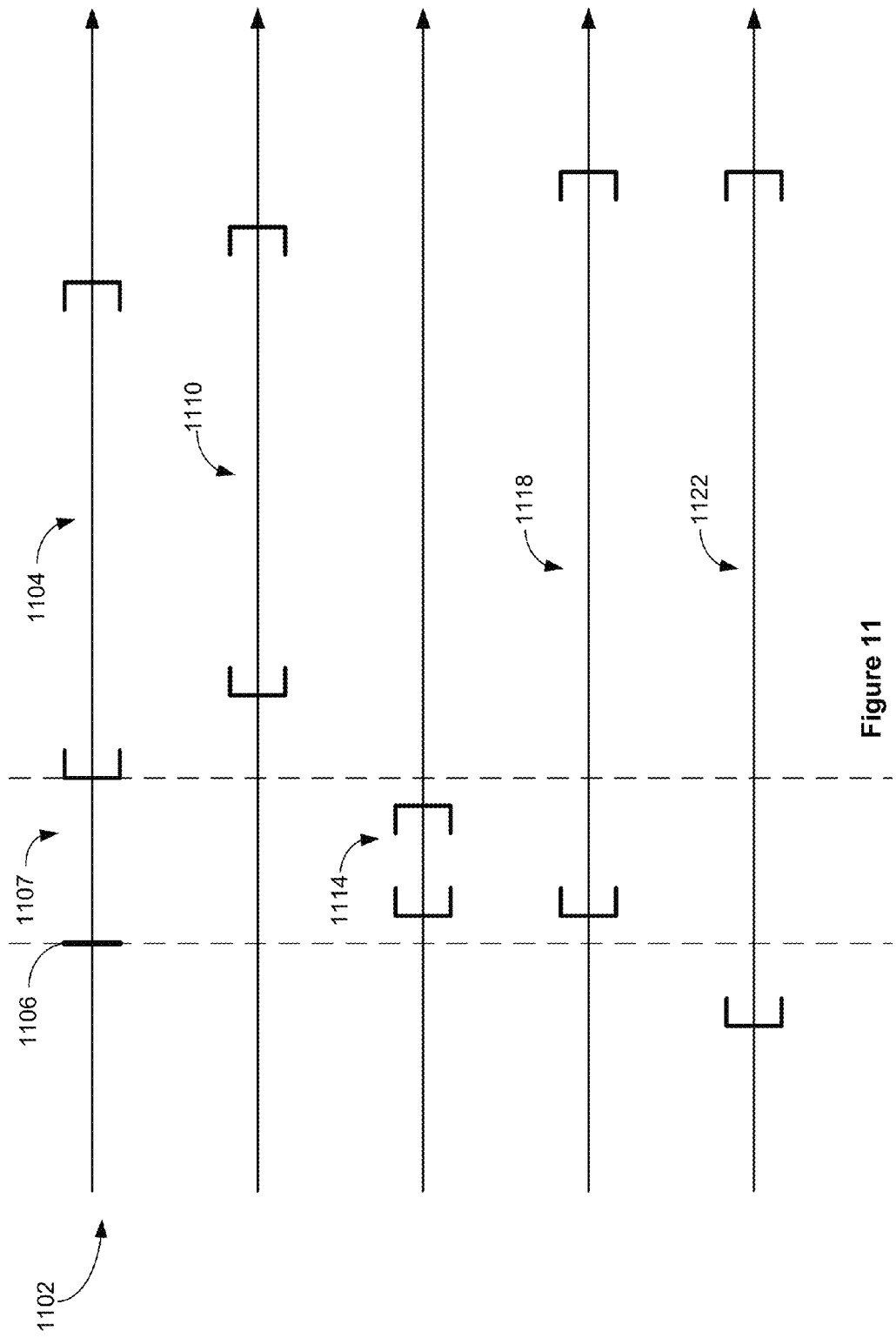
FIG. 11 illustrates an example of classifying tuning events, according to some implementations.

FIG. 11 illustrates an example of the classification of tuning events, according to some implementations. A power status timeline 1102 for a set-top box includes a display device power status "powered-on" interval 1104. Interval 1104 is also associated with the HDMI connection. A period 1107 from time 1106 to the beginning of the interval 1104 marks a "lookback" period. Tuning interval 1110 for the set-top box overlaps, and starts after the start of, the interval 1104, and thus is classified as associated with the HDMI connection. Tuning interval 1114 for the set-top box does not overlap the interval 1104, and thus is not classified as associated with the HDMI connection (it may be classified as associated with another output, such as an analog connection).

Tuning interval 1118 for the set-top box overlaps the interval 1104 but starts before the start of the interval 1104. However, the start of the tuning interval 1118 is within the "lookback" period 1107. Thus, the tuning interval 1118 is classified as associated with the HDMI connection.

Tuning interval 1122 for the set-top box overlaps the interval 1104 but starts before the start of the interval 1104. The start of the tuning interval 1122 is outside the "lookback" period 1107. Thus, the tuning interval 1122 is not classified as associated with the HDMI connection (it may be classified as associated with another output, such as an analog connection).

Figure 12:
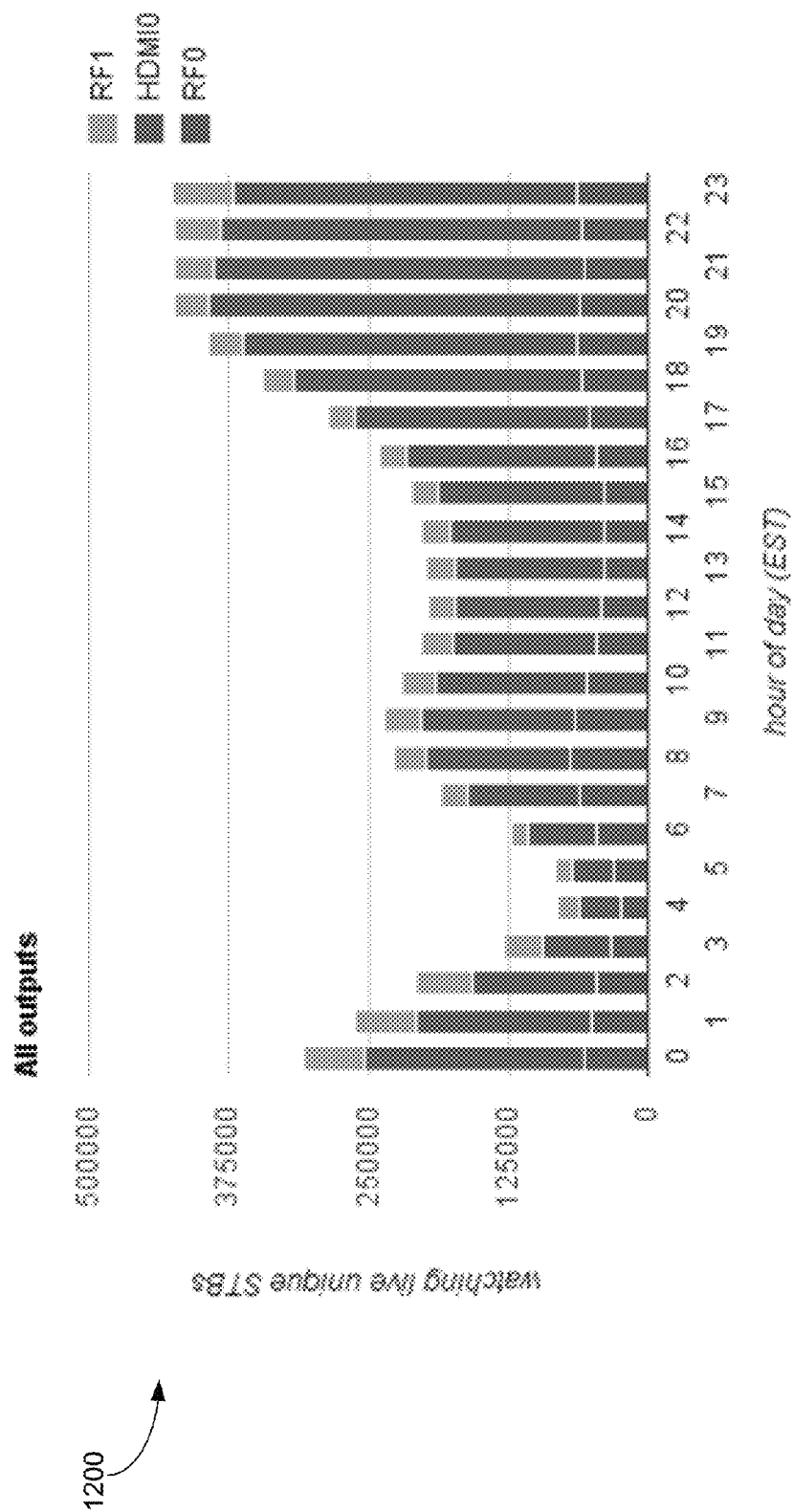
FIG. 12 is a table illustrating live unique set-top boxes by hour of day and including a breakdown by type of output connection, according to some implementations.

When the classification is performed over many set-top boxes in a sample and the resulting data is aggregated, an example result is that which is shown in FIG. 12. FIG. 12 illustrates a histogram table 1200 that shows by hour of day programming sent by live unique set-top boxes, which is an indication of active viewership throughout the day. The totals for a respective hour of the day are further broken down by output connection (HDMI0 (HDMI output on "output 0"), RF0 (an analog output on logical "output 0"), and RF1 (another analog output)). As the table in FIG. 12 illustrates, viewership crests during the late-night hours and peaks around the evening "prime time" hours (around 20:00-23:00). Viewership using the HDMI output connection also peaks around the prime time hours.

In some implementations, association of a tuning interval with the HDMI connection or an analog connection is used as a proxy for the location of the corresponding set-top box within a household. For example, the HDMI connection is usually used in the living room (because of the location of the STB, primary high-definition or digital display, and the usually restricted length of the HDMI cable), and thus tuning events over the HDMI output connection are associated with the living room, and tuning events over analog connections are associated with other rooms where TV watching is not the primary activity (e.g., bedroom, kitchen). Further, this breakdown can also be considered as a breakdown by location where content is watched at certain parts of the day at different respective locations. A typical setup with multiple displays includes an HDMI connection in the living room and analog connections being used in, e.g., the bedroom and the kitchen. In the table 1200 viewership over the HDMI connection peaks during the evening, implying that the living room TV is watched most during the evening hours.

In some implementations, the determination of viewership metrics and adjusted viewership metrics are illustrated by the equations below. Given a set H of STBs that send tuning information and display power status information (e.g., STBs 102) and a set S of STBs that send tuning information but not display power status information (e.g., STBs 108), and set A of STBs being the union of sets H and S (e.g., STBs 102 and 108). For an individual set-top box in set A, the unadjusted tuning information interval timeline is $U_i$ and the display device power status information timeline is $P_i$. $P_i$ for an STB in set S is empty, and $P_i$ for an STB in set H is non-empty. The display device power status-adjusted (or "capped") tuning information timeline $C_i$ for an STB in set H is the interval intersections of every pair of intervals in the set Cartesian product $U_i \times P_i$ for that STB (e.g., adjusted tuning information timeline 506, FIG. 5). For a function M=f(L(X)) that determines a particular viewership metric for any set X of set-top boxes using the tuning information timelines L from the STBs in set X, the unadjusted viewership metric for sets H and S may be expressed respectively as:

$$M(H)=f(U(H)) \quad \text{(Equation 1);}$$

$$M(S)=f(U(S)) \quad \text{(Equation 2).}$$

$$M(A)=f(U(A)) \quad \text{(Equation 3)}$$

The power status-adjusted viewership metric for set H is:

$$M'(H)=f(C(H)) \quad \text{(Equation 4).}$$

An adjustment or correction factor K may be calculated as:

$$K=M'(H)/M(H)=f(C(H))/f(U(H)) \quad \text{(Equation 5).}$$

An adjusted viewership metric for set S is:

$$M'(S)=M(S)*K=f(U(S))*K \quad \text{(Equation 6).}$$

An adjusted viewership metric for set A is:

$$M'(A)=M(A)*K=M(S \cup H)*K \quad \text{(Equation 7).}$$

For some metrics, M(S ∪ H)=M(S)+M(H), and so for these metrics, Equation 6 may be written as:

$$M'(A)=(M(S)+M(H))*K=(M(S)*K)+(M(H)*K)=M'(S)+M'(H)=(f(U(S))*K)+f(C(H)) \quad \text{(Equation 8).}$$

The operation of Equations 1-7 may be illustrated with the following example. Suppose that the number of sample unique visits, taking only into account the tuning information, on a particular network during a particular time interval, is 80. Thus, M(A)=80. This means that 80 unique set-top boxes in the sample reported that they were tuned at some point during that time interval to that particular network. Out of those 80 visits, the display device power status information of 50 of these unique set-top boxes is known. In other words, M(H)=50 and M(S)=30.

When the tuning information for these 50 set-top boxes is adjusted to account for the corresponding display device power status information, the number of unique visits goes down, from 50, to 40. In other words, M'(H)=40. The adjustment factor K may be calculated as M'(H)/M(H)=40/50=0.8. The adjusted number of unique visits then becomes M'(A)=M(A)*K=80*0.8=64. The adjusted number of unique visits among the set-top boxes where the display device power status information is unknown is M'(S)=30*0.8=24.

In some implementations, the tuning information may be subject to other capping rules before the display device power status information is taken into account. An example of a capping rule is that tuning intervals may be truncated to fit a predefined maximum duration (e.g., 2 hours, 3 hours). In Equations 1-3, M(H), M(S), and M(A) may be calculated as f(T(H)), f(T(S)), and f(T(A)), respectively, where T(X) are the tuning information timelines T, from set-top boxes in set X, that have been capped according to a capping rule unrelated to display device power status, such as a predefined maximum duration capping rule. Equations 3-7 apply analogously, with T(H), T(S), and T(A) replacing U(H), U(S), and U(A), respectively, in the equations, with the condition that $C_i$ for any set-top box in set H is still determined using an uncapped tuning information timeline $U_i$.

In some implementations, the display device power status information may be filtered for noisy information, unreliable information, and the like. For example, "powered-on" intervals of less than 3 minutes in duration may be filtered out and disregarded as noisy. The filtered display device power status information is used to determine the viewership metric (e.g., used to adjust the tuning information). The power status intervals, including the "powered-on" intervals, for a particular STB may be filtered out and disregarded if any of the intervals for the particular STB is longer than 16 hours (an indication of lack of user interaction). The power status intervals, including the "powered-on" intervals, for a particular STB may be filtered out and disregarded if any of the intervals for the particular STB started during a reboot period, which are predefined times of the day. A "powered-on" interval that starts during a reboot period (e.g., 3, 4, 5, or 6 AM Eastern) and has a duration of more than 4 hours is filtered out and disregarded as an artifact of a reboot period. Gaps of less than 5 minutes between two successive intervals may be filled, as the gap may result from a reboot of the set-top box.

In some implementations, STB information 400, 450 from multiple set-top boxes may be clustered according to attributes associated with the set-top boxes and their users. Examples of such attributes include demographics of the users of the set-top boxes, geographic locations of the set-top boxes, type of the respective STB (e.g., the model of set-top box), number of outputs on the respective STB and which of these outputs are being used to output content, placement of the STB in the household (e.g., living room, bedroom, etc.), and the provider (e.g., cable television system or satellite television system operator) who provided the STB to the end user. Viewership metrics may be determined for set-top boxes corresponding to STB information in a cluster; the set-top boxes within the cluster have one or more same attributes (e.g., demographics, placement, location, etc.). In other words, Equations 1-8 apply analogously; set A is the set-top boxes within the cluster (i.e., have a same attribute), and sets H and S are identified from the set-top boxes within the cluster. Determining viewership metrics within a cluster (i.e., determining viewership metrics for set-top boxes having the same attribute, which can be determined by any combination of the STB information 400 (FIG. 4A) or 450 (FIG. 4B)) may help correct for sample bias in the viewership metrics. Further, within a cluster (i.e., having the same attributes/demographics), an adjusted viewership metric may be determined for set-top boxes for which display device power status information is unknown by using an adjustment factor determined from set-top boxes for which display device power status information is known. Thus, an adjustment factor K determined from set H within a cluster may be applied to adjust a viewership metric for set S within the same cluster.

In some implementations, one or more attributes are self-reported by the set-top boxes themselves, and the viewership metrics system 116 determines these attributes in accordance with the self-reported attributes information. For example, STB 400 or 450 may include an STB type 408, STB outputs information 410, a STB geographic location 412, and provider information 414.

In some implementations, one or more attributes are determined from subscriber information. For example, an STB identifier 406 may be included in STB information 400 or 415. The STB identifier 406 is associated with a customer account in the content distribution system 114, which is typically also operated by the same entity as the provider of the STB. Attributes such as demographics and geographic location may be retrieved from the customer account and received by the viewership metrics system in a manner that does not personally identify any specific user or customer. In some other implementations, attributes such as demographics associated with a STB may be determined by analyzing the channel tuning activity (e.g., which channels tuned and at what times) at the STB and comparing them with previously determined (e.g., determined in-house or by external parties) demographic trends for the channels and content on the channels (e.g., the STB user is more likely to be male if sports channels predominate the channel tuning activity, the STB user is more likely to be Hispanic if Spanish-language channels predominate the channel tuning activity, etc.).

In some implementations, one or more attributes are determined by analysis of the tuning information reported by the set-top boxes. For example, a set-top box whose tuning activity typically takes place in "prime time" may be determined to be located in the living room of a household, and a set-top box whose tuning activity typically takes place in late night may be determined to be located in a bedroom of a household.

In some implementations, an adjustment factor K that is determined for a first cluster may be applied, after normalization, to determine a viewership metric for a second cluster that has set-top boxes associated with a different attribute than the set-top boxes in the first cluster. For example, the adjustment factor K may be normalized according to a ratio comparing the attribute for the first cluster to the attribute for the second cluster. The unadjusted viewership metric for the second cluster is multiplied by the normalized factor K to determine an adjusted viewership metric.

Figure 6A:
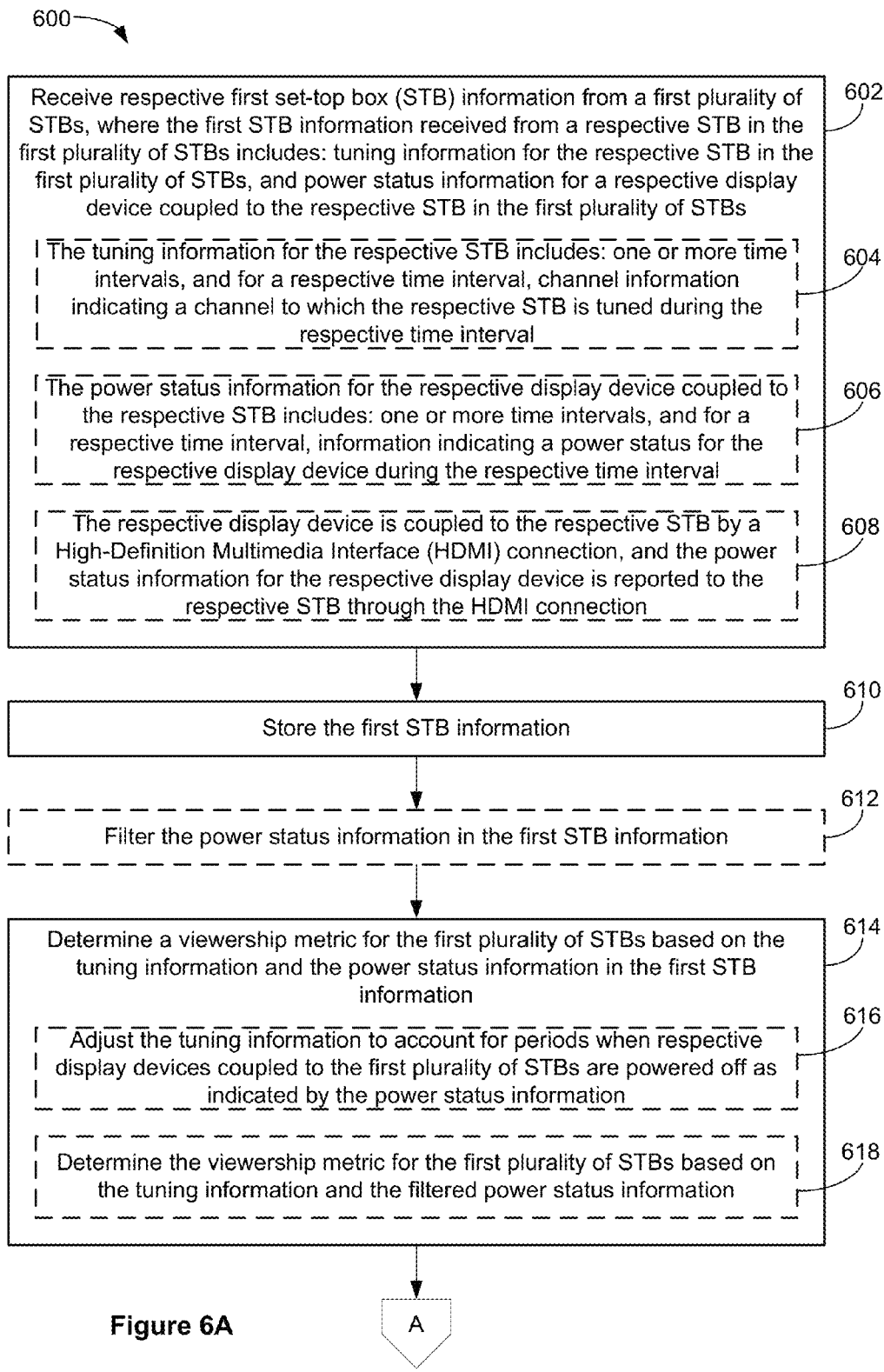
FIGS. 6A-6B are flow diagrams illustrating a process of determining a viewership metric, according to some implementations.
Figure 6B:
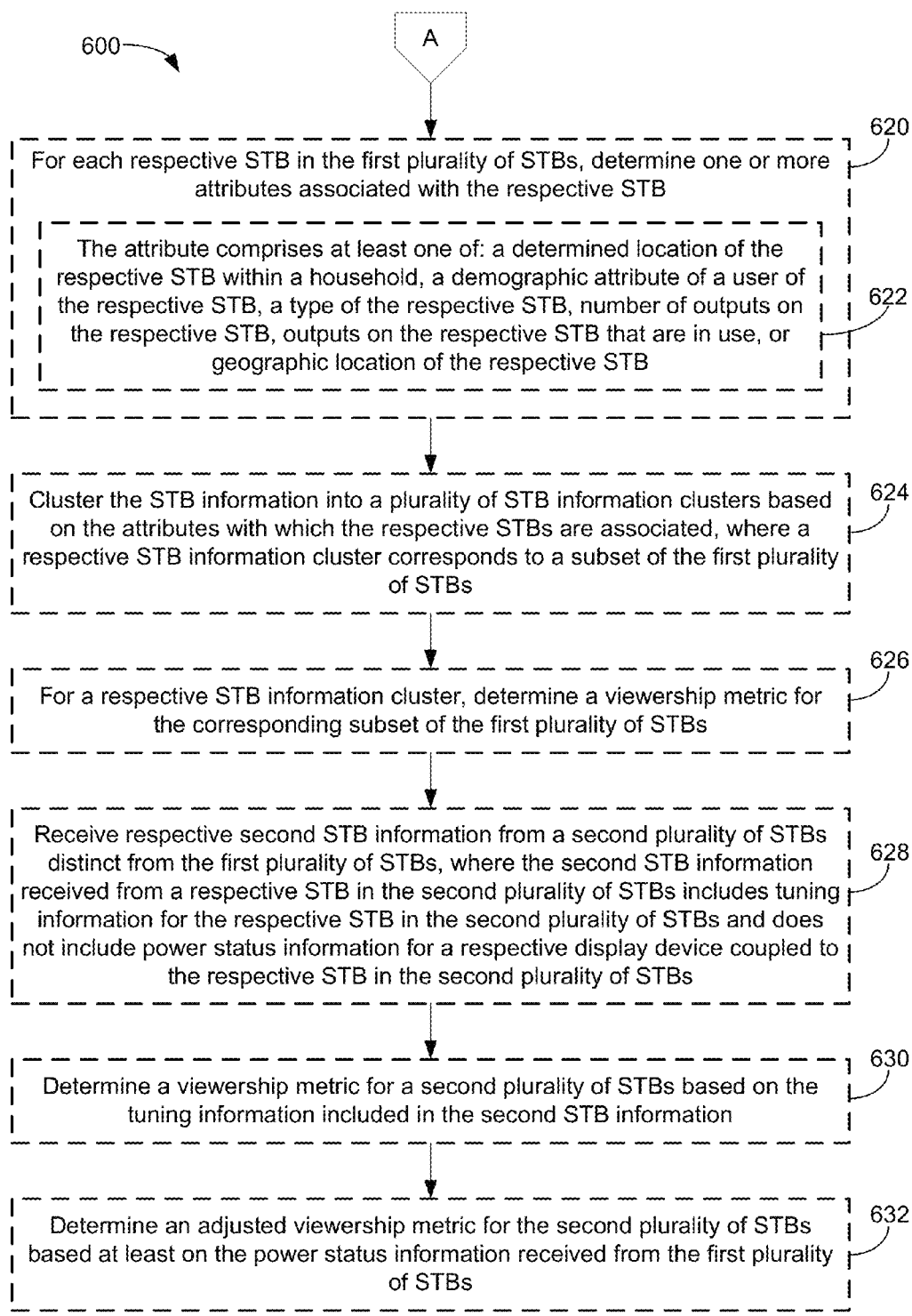

FIGS. 6A-6B are flow diagrams illustrating a process 600 for determining a viewership metric, according to some implementations. Each of the operations shown in FIGS. 6A-6B may correspond to instructions stored in a computer memory or computer readable storage medium. In some implementations, process 600 may be implemented at a viewership metrics system 116 (e.g., at a viewership metrics server 300).

The system receives respective first set-top box (STB) information from a first plurality of STBs (602) The first STB information received from a respective STB in the first plurality of STBs includes tuning information for the respective STB in the first plurality of STBs, and power status information for a respective display device coupled to the respective STB in the first plurality of STBs. For example, the viewership metrics system 116 receives STB information 400 from each of STBs 102. The STB information 400 from a respective STB 102 includes tuning information 402 and display device power status information 416.

The system stores the first STB information (610). For example, the STB information 400 may be stored as raw STB information 316 (FIG. 3) for processing.

The system determines a viewership metric for the first plurality of STBs based on the tuning information and the power status information in the first STB information (614). In some implementations, the determining includes adjusting the tuning information to account for periods when respective display devices coupled to the first plurality of STBs are powered off as indicated by the power status information (616). For example, for an STB, tuning information may be adjusted to account for periods where the display device is not powered on, as in FIG. 5. The adjusted tuning information from multiple STBs is aggregated and used as the argument for a viewership metric function, as in Equation 4 above.

In some implementations, the power status information in the first STB information is filtered (612), and the determining includes determining the viewership metric for the first plurality of STBs based on the tuning information and the filtered power status information (618). The power status information for a display device may be filtered, as described above with respect to FIG. 5 and Equations 1-8, to remove noisy information.

In some implementations, the tuning information for the respective STB includes one or more time intervals, and for a respective time interval, channel information indicating a channel to which the respective STB is tuned during the respective time interval (604). For example, tuning information 402 (FIG. 4A) includes one or more tuning intervals 418 and for each interval 418, channel information 420 indicating the tuned channel during the respective interval.

In some implementations, the power status information for the respective display device coupled to the respective STB includes one or more time intervals, and for a respective time interval, information indicating a power status for the respective display device during the respective time interval (606). For example, display device power status information 416 (FIG. 4A) includes one or more power status intervals 422 and for each interval 422, a power status 424 indicating the power status of the display device during the respective interval.

In some implementations, the respective display device is coupled to the respective STB by a High-Definition Multimedia Interface (HDMI) connection; and the power status information for the respective display device is reported to the respective STB through the HDMI connection (608). For example, connection 106-1 coupling STB 102-1 to display device 104-1 is an HDMI connection.

In some implementations, for each respective STB in the first plurality of STBs, the system determines one or more attributes associated with the respective STB (620). The system clusters the STB information into a plurality of STB information clusters based on the attributes with which the respective STBs are associated, where a respective STB information cluster corresponds to a subset of the first plurality of STBs (624), and for a respective STB information cluster, determines a viewership metric for the corresponding subset of the first plurality of STBs (626). The attribute may be at least one of: a determined location of the respective STB within a household, a demographic attribute of a user of the respective STB, a type of the respective STB, number of outputs on the respective STB, outputs on the respective STB that are in use, or geographic location of the respective STB (622).

As described above, in some implementations, STB information may be clustered according to the attributes associated with the STBs that reported the STB information, and a viewership metric may be determined for the STBs associated with the STB information within a cluster.

In some implementations, the system receives respective second STB information from a second plurality of STBs distinct from the first plurality of STBs (628). The second STB information received from a respective STB in the second plurality of STBs includes tuning information for the respective STB in the second plurality of STBs and does not include power status information for a respective display device coupled to the respective STB in the second plurality of STBs. For example, STB information 450 sent by STBs 108 and received by viewership metrics system 116 include tuning information 402 but not display device power status information 416.

The system determines a viewership metric for a second plurality of STBs based on the tuning information included in the second STB information (630), and determines an adjusted viewership metric for the second plurality of STBs based at least on the power status information received from the first plurality of STBs (632). For example, Equation 2 described above determines a viewership metric for a set of STBs (e.g., STBs 108) whose display device power status is unknown (e.g., because the STBs do not provide them). Equations 5 and 6 described above determine an adjusted viewership metric for the set of STBs (e.g., by determining an adjustment factor using a viewership metric that does take display device power status information into account and applying the adjustment factor to the viewership metric for the set of STBs).

Figure 7A:
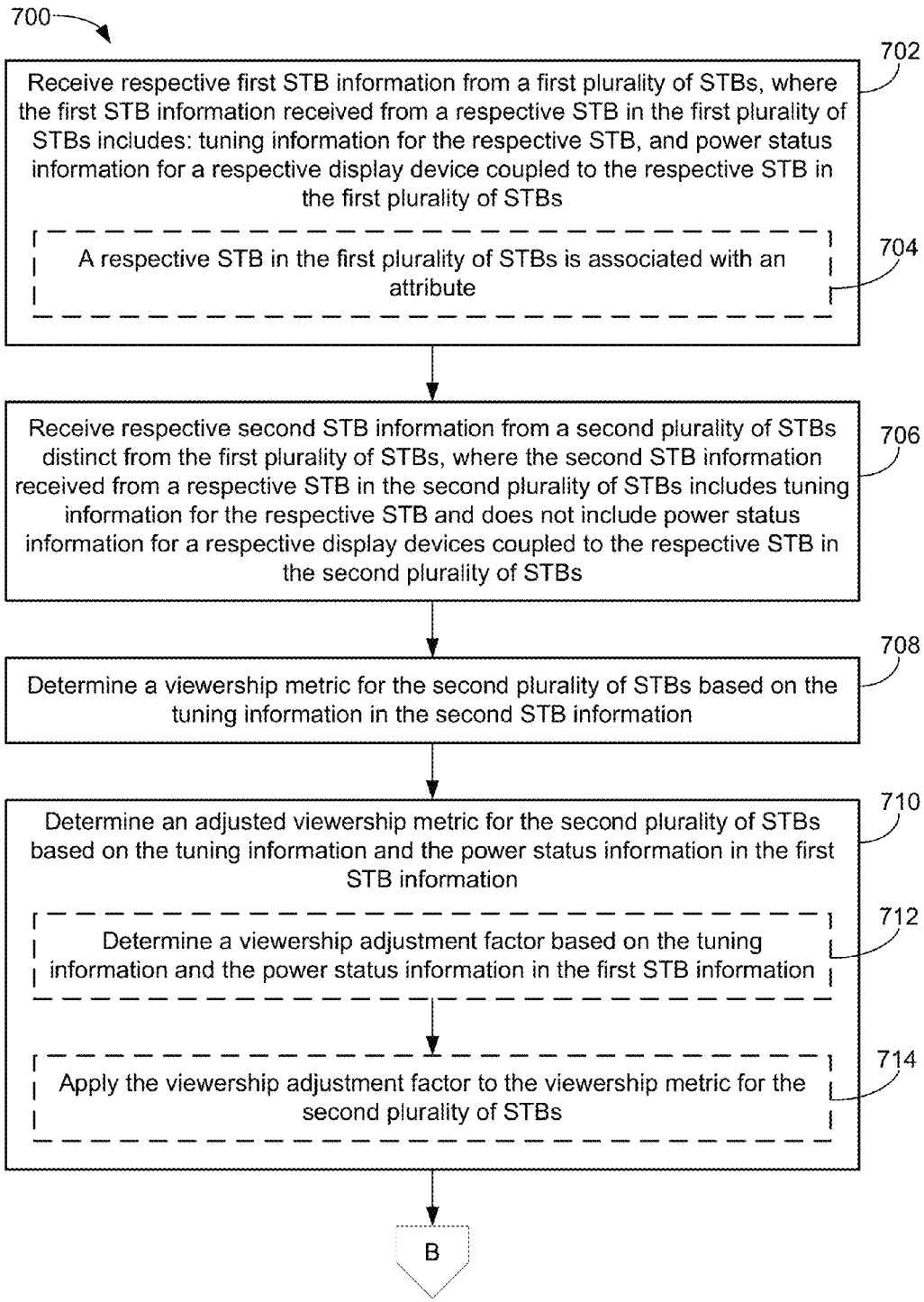
FIGS. 7A-7B are flow diagrams illustrating a process of determining a viewership metric, according to some implementations.
Figure 7B:
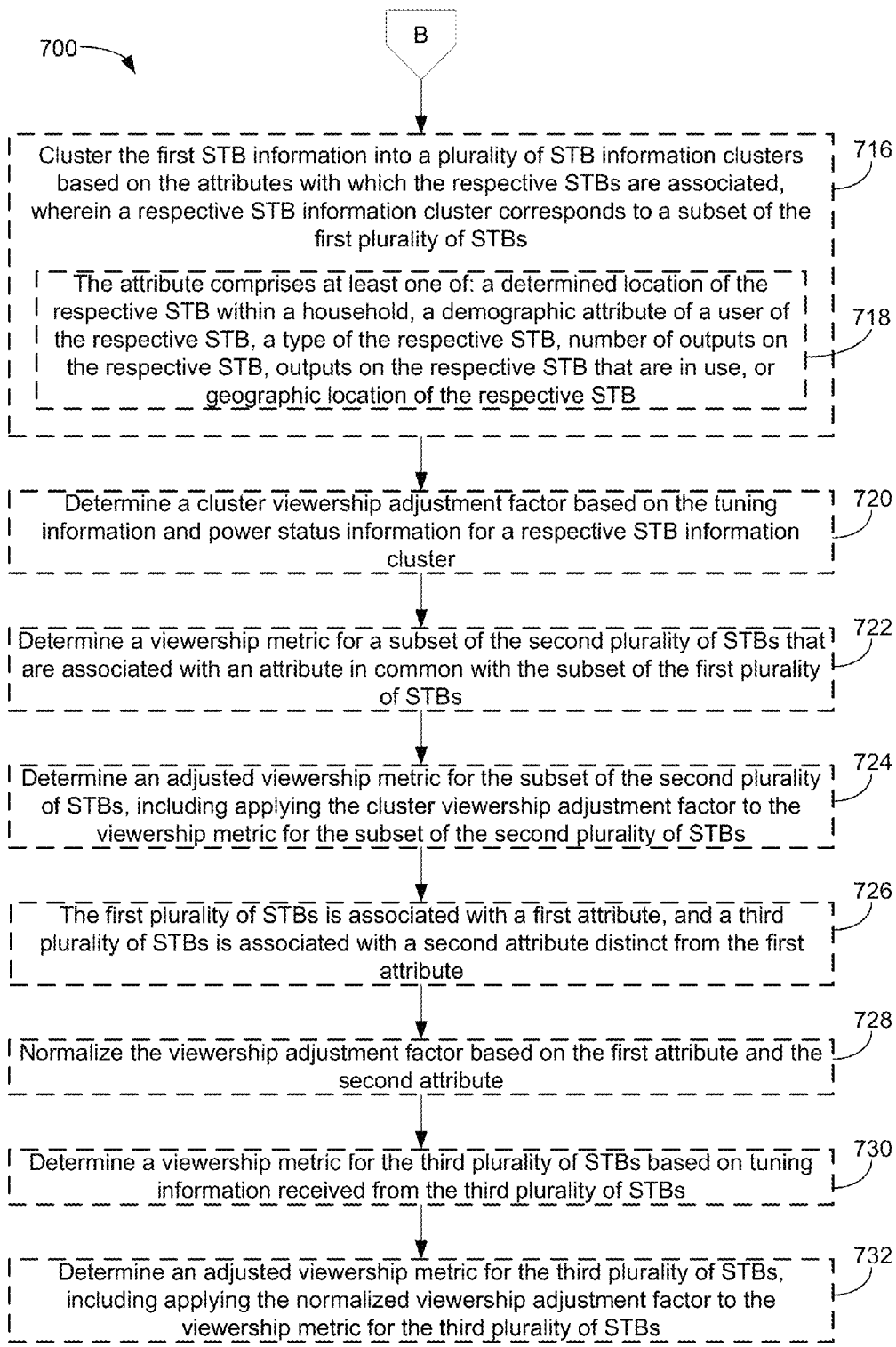

FIGS. 7A-7B are flow diagrams illustrating a process 700 for determining a viewership metric, according to some implementations. Each of the operations shown in FIGS. 7A-7B may correspond to instructions stored in a computer memory or computer readable storage medium. In some implementations, process 700 may be implemented at a viewership metrics system 116 (e.g., at a viewership metrics server 300).

The system receives respective first STB information from a first plurality of STBs (702). The first STB information received from a respective STB in the first plurality of STBs includes tuning information for the respective STB, and power status information for a respective display device coupled to the respective STB in the first plurality of STBs. For example, the viewership metrics system 116 receives STB information 400 from each of STBs 102. The STB information 400 from a respective STB 102 includes tuning information 402 and display device power status information 416.

The system receives respective second STB information from a second plurality of STBs distinct from the first plurality of STBs (706). The second STB information received from a respective STB in the second plurality of STBs includes tuning information for the respective STB and does not include power status information for a respective display devices coupled to the respective STB in the second plurality of STBs. For example, the viewership metrics system 116 receives STB information 450 from each of STBs 108. The STB information 450 from a respective STB 108 includes tuning information 402 but not display device power status information 416.

The system determines a viewership metric for the second plurality of STBs based on the tuning information in the second STB information (708), and determines an adjusted viewership metric for the second plurality of STBs based on the tuning information and the power status information in the first STB information (710). For example, Equation 2 described above determines a viewership metric for a set of STBs (e.g., STBs 108) whose display device power status is unknown (e.g., because the STBs do not provide them). Equations 5 and 6 described above determine an adjusted viewership metric for the set of STBs (e.g., by determining an adjustment factor using a viewership metric that does take display device power status information into account and applying the adjustment factor to the viewership metric for the set of STBs).

In some implementations, determining the adjusted viewership metric for the second plurality of STBs based on the tuning information and the power status information in the first STB information includes determining a viewership adjustment factor based on the tuning information and the power status information in the first STB information (712), and applying the viewership adjustment factor to the viewership metric for the second plurality of STBs (714). For example, the adjustment factor K in Equation 5 above is determined based on tuning information and the display device power status information from STBs whose display device power status information is known (e.g., STBs 102). The factor K is applied to the viewership metric M(S) for STBs 108 to determine the adjusted viewership metric M'(S) for STBs whose display device power status information is not known (e.g., STBs 108). In some implementations, the factor K is applied to the viewership metric M(S), provided the factor K can be reliably estimated (i.e., the number of STBs with known display device power status information (STBs 102) is large enough (e.g., at least a predefined threshold) for that particular period of time).

In some implementations, a respective STB in the first plurality of STBs is associated with an attribute (704). The system clusters the first STB information into a plurality of STB information clusters based on the attributes with which the respective STBs are associated, where a respective STB information cluster corresponds to a subset of the first plurality of STBs (716).

In some implementations, the system determines a cluster viewership adjustment factor based on the tuning information and power status information for a respective STB information cluster (720), determines a viewership metric for a subset of the second plurality of STBs that are associated with an attribute in common with the subset of the first plurality of STBs (722), and determines an adjusted viewership metric for the subset of the second plurality of STBs, including applying the cluster viewership adjustment factor to the viewership metric for the subset of the second plurality of STBs (724). For example, as described above, Equations 1-8 apply analogously to the STBs within a cluster. M(S) and M(H) are determined based on the STB information within the cluster, where S and H, are subsets of STBs 108 and 102, respectively, that are in the cluster. The adjustment factor K is determined using the cluster-based M(H), the tuning information and the display device power status information within the cluster. The factor K is applied to M(S) to determine the adjusted metric M'(S).

In some implementations, the attribute includes at least one of: a determined location of the respective STB within a household, a demographic attribute of a user of the respective STB, a type of the respective STB, number of outputs on the respective STB, outputs on the respective STB that are in use, or geographic location of the respective STB (718).

In some implementations, the first plurality of STBs is associated with a first attribute, and a third plurality of STBs is associated with a second attribute distinct from the first attribute (726). The system normalizes the viewership adjustment factor based on the first attribute and the second attribute (728), determines a viewership metric for the third plurality of STBs based on tuning information received from the third plurality of STBs (730), and determines an adjusted viewership metric for the third plurality of STBs, including applying the normalized viewership adjustment factor to the viewership metric for the third plurality of STBs (732). As described above, the adjustment factor K determined for one cluster may be applied to determine a viewership metric for another cluster.

Figure 8:
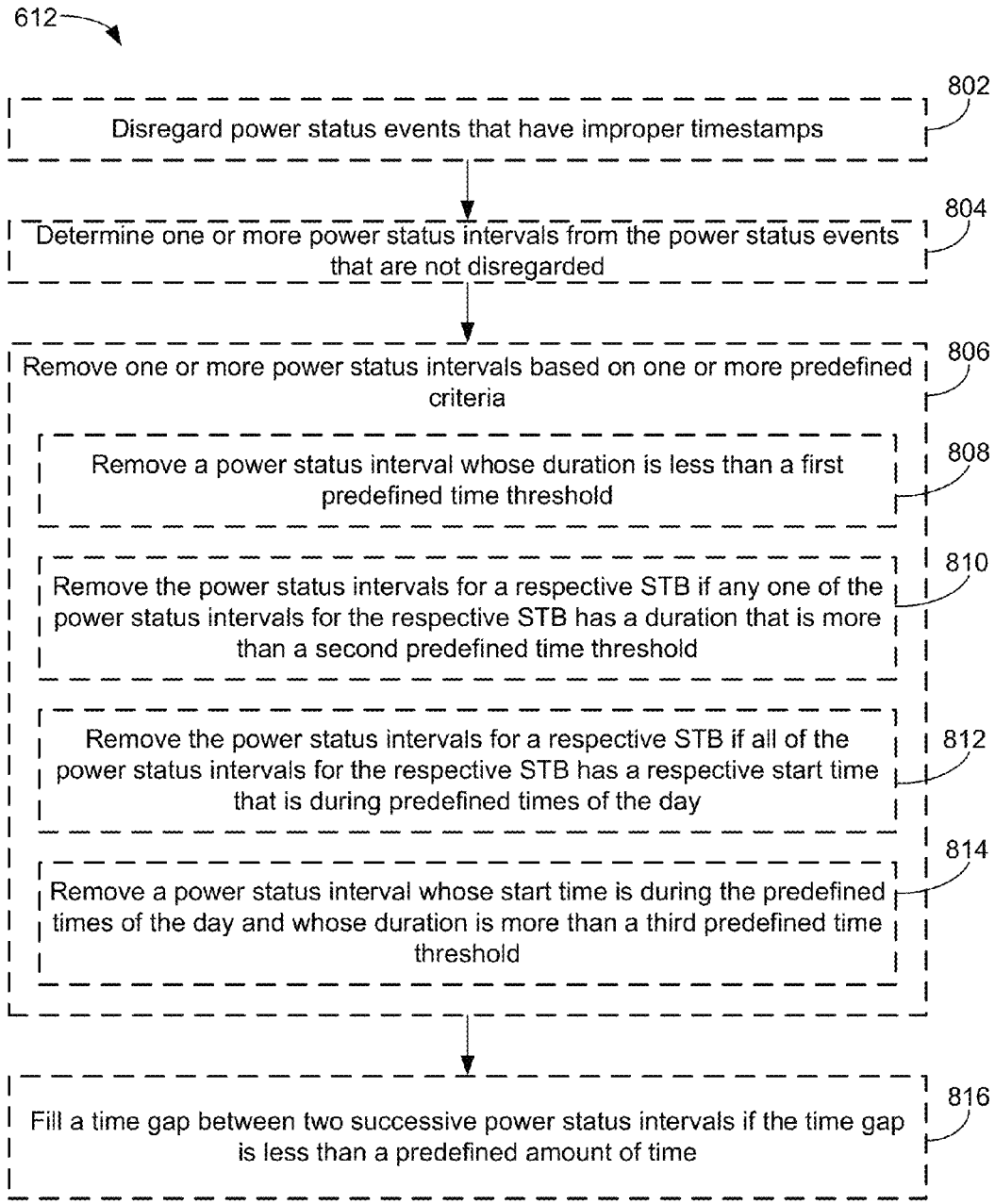
FIG. 8 is a flow diagram illustrating a process for filtering power status intervals, according to some implementations.

FIG. 8 is a flow diagram illustrating block 612 of FIGS. 6A-6B in further detail, according to some implementations. In some implementations, for a respective STB in the plurality of STBs, the power status information includes a plurality of power status events for the STB or the coupled display device. Each of the power status events has a timestamp. Filtering the power status information includes processing the power status events.

The system disregards power status events that have improper timestamps (802), and determines one or more power status intervals from the power status events that are not disregarded (804). Power status intervals (e.g., [display_on, display_off], [display_on, stb_off]) may be determined from a chronologically ordered sequence of the power status events. Before the determination, the power status events that have improper timestamps (e.g., a timestamp with date Jan. 1, 1900) are removed or otherwise disregarded, and the power status intervals are determined without the disregarded power status events. For example, in FIG. 10, the last display_powerstate event, with the timestamp of "1900-01-01 00:00:00GMT," has an improper timestamp and thus may be removed.

One or more of the power status intervals are removed based on one or more predefined criteria (806). The filtering includes removing power status intervals that are considered to be noisy or otherwise unreliable. The criteria may include the duration of the interval or the time when the interval started.

A power status interval is removed if the duration of the interval is less than a first predefined time threshold (808). A power status interval of very short duration (e.g., less than 3 minutes) is removed or otherwise disregarded.

All the power status intervals for a particular STB are removed if any one of the power status intervals for the particular STB has a duration that is more than a second predefined time threshold (810). An interval of long duration (e.g., longer than 8 hours, longer than 10 hours, longer than 12 hours, or longer than 16 hours) is an indication of insufficient of user interaction, and thus the STB is deemed an unreliable source of viewership information. The STB is effectively removed from the sample by removing or otherwise disregarding its power status intervals.

All the power status intervals for a particular STB are removed if all of the power status intervals for the particular STB have a respective start time that is during predefined times of the day (812). Certain times of the day (e.g., certain hours at night) are designated as reboot periods. If all of the intervals start during those hours, the STB is identified as reporting only reboot signals and thus an unreliable source of viewership information. The STB is effectively removed from the sample by removing or otherwise disregarding its power status intervals.

A power status interval is removed if its start time is during the predefined times of the day and its duration is more than a third predefined time threshold (814). An interval that starts during the reboot period and is longer than a certain amount of time (e.g., 4 hours) is removed or otherwise disregarded.

A time gap between two successive power status intervals is filled if the time gap is less than a predefined amount of time (816). For two chronologically successive "powered-on" intervals where the display device is on, if the time gap between the two intervals is less than a certain amount of time (e.g., 5 minutes), the gap between the two is filled, effectively joining the two intervals into one interval by extending one interval to the other.

The power status intervals that remain from the filtering step 612 may be used to determine a viewership metric, as described above with reference to step 614 (e.g., the remaining power status intervals are used to adjust the tuning information).

Figure 9:
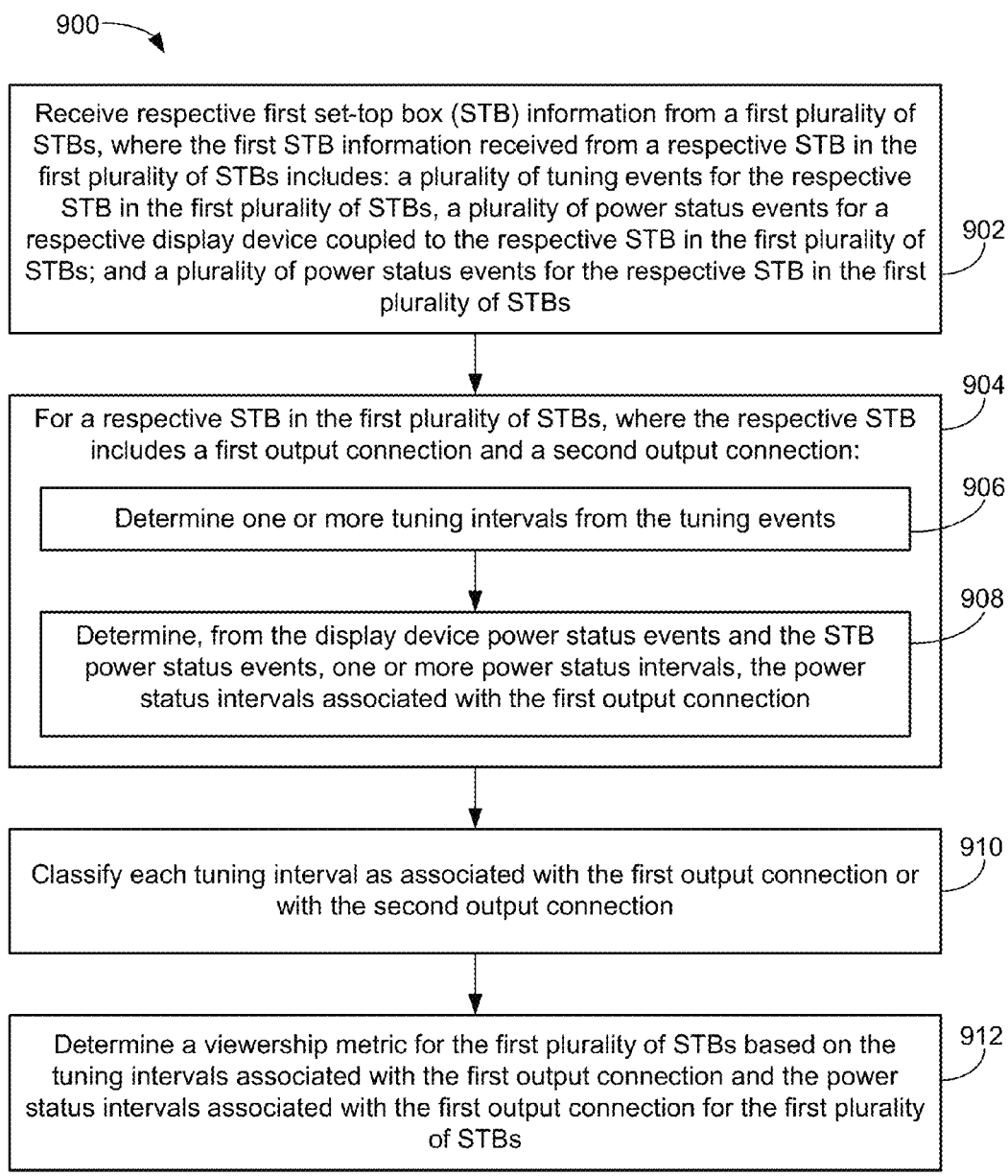
FIG. 9 is a flow diagram illustrating a process of determining a viewership metric, according to some implementations.

FIG. 9 is a flow diagram illustrating a process 900 for determining a viewership metric, according to some implementations. Each of the operations shown in FIG. 9 may correspond to instructions stored in a computer memory or computer readable storage medium. In some implementations, process 900 may be implemented at a viewership metrics system 116 (e.g., at a viewership metrics server 300).

The system receives respective first set-top box (STB) information from a first plurality of STBs (902) The first STB information received from a respective STB in the first plurality of STBs includes a plurality of tuning events for the respective STB in the first plurality of STBs, a plurality of power status events for a respective display device coupled to the respective STB in the first plurality of STBs; and a plurality of power status events for the respective STB in the first plurality of STBs. For example, the viewership metrics system 116 receives STB information 400 from each of STBs 102. The STB information 400 from a respective STB 102 includes one or more tuning events, one or more power status events for the display device, and one or more power status events for the STB.

For a respective STB in the first plurality of STBs, where the respective STB includes a first output connection and a second output connection (904): the system determines one or more tuning intervals from the tuning events (906), and determines, from the display device power status events and the STB power status events, one or more power status intervals, the power status intervals associated with the first output connection (908). For a particular STB, tuning intervals are determined from the tuning events for the STB and power status intervals (e.g., [display_on, display_off], [display_on, stb_off]) are determined from the power status events. The particular STB includes a first output connection (e.g., HDMI) and a second output connection (e.g., analog), and the determined power status intervals are associated with the first connection (e.g., HDMI).

The system classifies each tuning interval as associated with the first output connection or with the second output connection (908). Each of the tuning intervals are classified as associated with the first connection (e.g., HDMI) or with the second connection. For a particular STB, a tuning interval is classified as associated with the first connection if the tuning interval overlaps with a power status interval (which is associated with the first connection) and does not start earlier than the overlapping power status interval by more than a predefined amount of time (e.g., 5 minutes). Otherwise the tuning interval is classified as associated with the second connection. Examples of the classification are described above with reference to FIG. 11.

The system determines a viewership metric for the first plurality of STBs based on the tuning intervals associated with the first output connection and the power status intervals associated with the first output connection for the first plurality of STBs (910). A viewership metric is determined using the tuning intervals that are associated with the first connection and the power status intervals (which are also associated with the first connection).

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

Reference has been made in detail to implementations, examples of which are illustrated in the accompanying drawings. In the above detailed description, numerous specific details are set forth in order to provide a thorough understanding of the referenced implementations. However, it will be apparent to one of ordinary skill in the art that the referenced implementations may be practiced without these specific details. In other instances, well-known methods, procedures, components, circuits, and networks have not been described in detail so as not to unnecessarily obscure aspects of the implementations.

The foregoing description, for purpose of explanation, has been described with reference to specific implementations. The implementations were chosen and described in order to best explain the principles of the invention and its practical applications, to thereby enable others skilled in the art to best utilize the invention and various implementations with various modifications as are suited to the particular uses contemplated. However, the illustrative discussions above are not intended to be exhaustive or to limit the invention to the precise forms disclosed. Many modifications and variations are possible in view of the above teachings.

What is claimed is:

1. A method, comprising:
at a server system having one or more processors and memory storing one or more programs executed by the one or more processors:
receiving respective first set-top box (STB) information from a first plurality of STBs, wherein the first STB information received from a respective STB in the first plurality of STBs includes: (1) tuning information for the respective STB in the first plurality of STBs, and (2) a power status signal transmitted by a respective display device to the respective STB in the first plurality of STBs, the power status signal for the respective display device including information regarding time intervals during which the respective display device is powered on and powered off;
filtering the power status signal by disregarding a power status signal of an STB of the plurality of STBs responsive to the power status signal identifying a power-on time within a predetermined time period corresponding to a reboot period;
determining a viewership metric for the first plurality of STBs based on the tuning information and the filtered power status signal in the first STB information;
generating a viewership adjustment factor that is normalized based on a first attribute and a second attribute that are associated with the first plurality of STBs and a second plurality of STBs, respectively;
determining a viewership metric for the second plurality of STBs based on tuning information received from the second plurality of STBs; and
determining an adjusted viewership metric for the second plurality of STBs, including applying the normalized viewership adjustment factor to the viewership metric for the second plurality of STBs.

2. The method of claim 1, wherein determining the viewership metric for the first plurality of STBs based on the tuning information and the power status signal in the first STB information comprises:
adjusting the tuning information to account for periods when respective display devices coupled to the first plurality of STBs are powered off as indicated by the power status signal.

3. The method of claim 1, wherein the tuning information for the respective STB comprises:
one or more time intervals, and
for a respective time interval of the one or more time intervals, channel information indicating a channel to which the respective STB is tuned during the respective time interval.

4. The method of claim 1, wherein the power status signal for the respective display device coupled to the respective STB comprises:
one or more time intervals, and
for a respective time interval of the one or more time intervals, information indicating a power status for the respective display device during the respective time interval.

5. The method of claim 1, wherein the respective display device is coupled to the respective STB by a High-Definition Multimedia Interface (HDMI) connection; and the power status signal for the respective display device is reported to the respective STB through the HDMI connection.

6. The method of claim 1, further comprising:
for each respective STB in the first plurality of STBs, determining one or more attributes associated with the respective STB;
clustering the STB information into a plurality of STB information clusters based on the one or more attributes with which the respective STBs are associated, wherein a respective STB information cluster corresponds to a subset of the first plurality of STBs; and
for a respective STB information cluster, determining a viewership metric for the corresponding subset of the first plurality of STBs.

7. The method of claim 6, wherein the one or more attributes comprise at least one of: a determined location of the respective STB within a household, a demographic attribute of a user of the respective STB, a type of the respective STB, a number of outputs on the respective STB, a number of outputs on the respective STB that are in use, or a geographic location of the respective STB.

8. The method of claim 1, further comprising:
receiving respective third STB information from a third plurality of STBs distinct from the first and second plurality of STBs, wherein the third STB information received from a respective STB in the third plurality of STBs includes tuning information for the respective STB in the third plurality of STBs and does not include power status signal for a respective display device coupled to the respective STB in the third plurality of STBs;
determining a viewership metric for the third plurality of STBs based on the tuning information included in the third STB information; and
determining an adjusted viewership metric for the third plurality of STBs based at least on the power status signal received from the first plurality of STBs.

9. The method of claim 8, wherein a respective STB in the first plurality of STBs is associated with an attribute, the method further comprising:
clustering the first STB information into a plurality of STB information clusters based on the attributes with which the respective STBs are associated, wherein a respective STB information cluster corresponds to a subset of the first plurality of STBs.

10. The method of claim 8, wherein determining the adjusted viewership metric for the third plurality of STBs based on the tuning information and the power status signal in the first STB information comprises:
determining a viewership adjustment factor based on the tuning information and the power status signal in the first STB information; and
applying the viewership adjustment factor to the viewership metric for the third plurality of STBs.

11. The method of claim 9, further comprising:
determining a cluster viewership adjustment factor based on the tuning information and power status signal for a respective STB information cluster;
determining a viewership metric for a subset of the third plurality of STBs that are associated with an attribute in common with the subset of the first plurality of STBs; and
determining an adjusted viewership metric for the subset of the third plurality of STBs, including applying the cluster viewership adjustment factor to the viewership metric for the subset of the third plurality of STBs.

12. The method of claim 9, wherein the attribute comprises at least one of: a determined location of the respective STB within a household, a demographic attribute of a user of the respective STB, a type of the respective STB, number of outputs on the respective STB, outputs on the respective STB that are in use, or geographic location of the respective STB.

13. The method of claim 1, further comprising:
filtering the power status signal in the first STB information, and
wherein determining the viewership metric for the first plurality of STBs includes determining the viewership metric for the first plurality of STBs based on the tuning information and the filtered power status signal.

14. The method of claim 1, wherein filtering the power status signal further comprises disregarding the power status signal of an STB of the plurality of STBs responsive to the power status signal identifying a power-on time within the predetermined time period and identifying a subsequent power-off time more than a second predetermined time period after the power-on time.

15. The method of claim 1, wherein filtering the power status signal further comprises disregarding all power status signals of a first STB of the plurality of STBs responsive to each power status signal identifying a power-on time within the predetermined time period.

16. A server system, comprising:
one or more processing units;
memory storing one or more programs to be executed by the one or more processing units, the one or more programs including instructions for:
receiving respective first set-top box (STB) information from a first plurality of STBs, wherein the first STB information received from a respective STB in the first plurality of STBs includes:
(1) tuning information for the respective STB in the first plurality of STBs, and
(2) a power status signal transmitted by a respective display device to the respective STB in the first plurality of STBs, the power status signal for the respective display device including information regarding time intervals during which the respective display device is powered on and powered off;
storing the first STB information;
filtering the power status signals of the first STB information by disregarding a power status signal of an STB of the first plurality of STBs responsive to said power status signal identifying a power-on time within a predetermined time period corresponding to a reboot period;
determining a viewership metric for the first plurality of STBs based on the tuning information and the filtered power status signals in the first STB information;
generating a viewership adjustment factor that is normalized based on a first attribute and a second attribute that are associated with the first plurality of STBs and a second plurality of STBs, respectively;
determining a viewership metric for the second plurality of STBs based on tuning information received from the second plurality of STBs; and
determining an adjusted viewership metric for the second plurality of STBs, including applying the normalized viewership adjustment factor to the viewership metric for the second plurality of STBs.

17. A non-transitory computer readable storage medium storing one or more programs configured for execution by a computer, the one or more programs comprising instructions for:
- receiving respective first set-top box (STB) information from a first plurality of STBs, wherein the first STB information received from a respective STB in the first plurality of STBs includes:
    (1) tuning information for the respective STB in the first plurality of STBs, and
    (2) a power status signal transmitted by a respective display device to the respective STB in the first plurality of STBs, the power status signal for the respective display device including information regarding time intervals during which the respective display device is powered on and powered off;
- storing the first STB information;
- filtering the power status signals of the first STB information by disregarding a power status signal of an STB of the first plurality of STBs responsive to said power status signal identifying a power-on time within a predetermined time period corresponding to a reboot period;
- determining a viewership metric for the first plurality of STBs based on the tuning information and the filtered power status signals in the first STB information;
- generating a viewership adjustment factor that is normalized based on a first attribute and a second attribute that are associated with the first plurality of STBs and a second plurality of STBs, respectively;
- determining a viewership metric for the second plurality of STBs based on tuning information received from the second plurality of STBs; and
- determining an adjusted viewership metric for the second plurality of STBs, including applying the normalized viewership adjustment factor to the viewership metric for the second plurality of STBs.

18. A method for improved audience measurement, comprising:
- receiving at a first time, by a server from a set-top box associated with a media device, a first power-on status signal and tuning information;
- receiving at a subsequent second time, by the server from the set-top box, a first power-off status signal;
- generating, by the server, a viewership record comprising a first time interval from the first time to the second time and the tuning information, responsive to the receiving the first power-off status signal from the set-top box;
- receiving at a subsequent third time, by the server from the set-top box, a second power-on status signal and tuning information;
- receiving at a subsequent fourth time, by the server from the set-top box, a second power-off status signal;
- determining, by the server, that the third time is less than a predetermined time after the second time, the predetermined time corresponding to a reboot period; and
- responsive to the determination, modifying, by the server, the first time interval of the viewership record to extend from the first to the fourth time, and disregarding the first power-off status signal and second power-on status signal.

* * * * *